(12) United States Patent
Chino et al.

(10) Patent No.: US 7,754,819 B2
(45) Date of Patent: Jul. 13, 2010

(54) THERMOPLASTIC ELASTOMER

(75) Inventors: Keisuke Chino, Kanagawa (JP); Manabu Kato, Kanagawa (JP); Tetsuji Kawazura, Kanagawa (JP)

(73) Assignee: Yokohama Rubber Co., Ltd., Tokyo (JP)

(*) Notice: Subject to any disclaimer, the term of this patent is extended or adjusted under 35 U.S.C. 154(b) by 1061 days.

(21) Appl. No.: 11/262,753

(22) Filed: Nov. 1, 2005

(65) Prior Publication Data
US 2006/0094829 A1    May 4, 2006

(30) Foreign Application Priority Data
Nov. 2, 2004    (JP) ............................... 2004-319113

(51) Int. Cl.
*C08F 8/32*    (2006.01)
(52) U.S. Cl. .................... 525/326.1; 525/374; 525/375; 525/379; 525/383; 525/386
(58) Field of Classification Search ............... 525/203, 525/204, 205, 206, 207, 217, 218, 220, 221, 525/285, 326.1, 326.7, 327.4, 327.6, 328.2, 525/328.3, 374, 375, 379, 383, 386
See application file for complete search history.

(56) References Cited

U.S. PATENT DOCUMENTS

| 2,719,141 | A | * | 9/1955 | Smith, Jr. ................. 525/327.7 |
| 4,801,647 | A | | 1/1989 | Wolfe, Jr. |
| 6,492,455 | B1 | * | 12/2002 | Nadolsky .................... 524/559 |
| 2002/0086952 | A1 | | 7/2002 | Chino et al. |
| 2004/0106744 | A1 | | 6/2004 | Chino et al. |

FOREIGN PATENT DOCUMENTS

| JP | 49-128992 | | 12/1974 |
| JP | 2000-169527 | | 6/2000 |
| KR | 2003069495 A | * | 8/2003 |
| WO | WO-0050103 A1 | * | 8/2000 |

* cited by examiner

*Primary Examiner*—Irina S Zemel
*Assistant Examiner*—Jeffrey Lenihan
(74) *Attorney, Agent, or Firm*—Finnegan, Henderson, Farabow, Garrett & Dunner, L.L.P.

(57) ABSTRACT

A thermoplastic elastomer having a side chain having a moiety crosslinkable by hydrogen bond containing a carbonyl-containing group and a nitrogen-containing heterocycle, and another side chain having a covalently crosslinkable moiety, the thermoplastic elastomer being able to be crosslinked at the covalently crosslinkable moiety by at least one bond selected from the group consisting of amide, ester, lactone, urethane, ether, thiourethane, and thioether. The thermoplastic elastomer exhibits excellent mechanical strength without detracting from its excellent recycleability.

16 Claims, No Drawings

THERMOPLASTIC ELASTOMER

BACKGROUND OF THE INVENTION

This invention relates to a thermoplastic elastomer, and more specifically, to a thermoplastic elastomer which has the property of repetitively and reproducibly undergoing crosslinking and de-crosslinking by changing temperature (hereinafter sometimes referred to as "recyclability").

Recycling of the once used materials is an urgent agenda in these days for environmental protection, resources saving, and other considerations. Crosslinked rubbers (vulcanized rubbers) have stable three dimensional network structure formed by covalent bonding of the macromolecular substance and the crosslinking agent (vulcanizing agent), and accordingly, very high strength. Re-molding of such material, however, is difficult due to the crosslinking by the strong covalent bonding. On the other hand, thermoplastic elastomers utilize physical crosslinking, and molding of such material is readily accomplished by heat melting the material with no complicated vulcanization or molding steps including the premolding.

A typical such thermoplastic elastomer is an thermoplastic elastomer containing a resin component and a rubber component, in which the microcrystalline resin component constitutes the hard segment acting as the crosslinking moiety for the three dimensional network structure thereby preventing plastic deformation of the rubber component (soft segment) at room temperature, and in which the softening or melting of the resin component realizes plastic deformation of the elastomer at an elevated temperature. Such thermoplastic elastomer containing the resin component, however, often suffers from the loss of rubber elasticity, and therefore, a material which can be imparted with thermoplasticity and which is free from such resin component is highly demanded.

In view of such situation, the inventors of the present invention have already proposed that a thermoplastic elastomer which is crosslinkable by hydrogen bond comprising an elastomeric polymer having a carbonyl group-containing group and a heterocyclic amine-containing group in its side chain can repetitively undergo crosslinking and de-crosslinking by changing temperature through the use of the hydrogen bond (see JP 2000-169527 A).

The thermoplastic elastomer having such properties has enormous industrial and environmental value, and such material is also expected as a material having improved higher tensile strength and excellent recyclability with little change in its physical properties even after repetitive crosslinking and de-crosslinking.

SUMMARY OF THE INVENTION

The thermoplastic elastomer described in JP 2000-169527 A, however, was sometimes insufficient in its mechanical strength even if a filler and the like were incorporated in the composition.

In view of the situation as described above, an object of the present invention is to provide a thermoplastic elastomer which exhibits excellent mechanical strength while retaining its excellent recyclability.

The inventors of the present invention have made an intensive study to solve the problems as described above, and found that a thermoplastic elastomer having a side chain containing a specific structure exhibits excellent physical properties including mechanical strength, and in particular, tensile strength while retaining sufficient recyclability. The present invention is based on such a finding. Accordingly, the present invention provides the thermoplastic elastomer described in the following (I) to (XI) and the composition described in the following (XII).

(I) A thermoplastic elastomer having a side chain having a moiety crosslinkable by hydrogen bond containing a carbonyl-containing group and a nitrogen-containing heterocycle, and another side chain having a covalently crosslinkable moiety, the thermoplastic elastomer being able to be crosslinked at the covalently crosslinkable moiety by at least one bond selected from the group consisting of amide, ester, lactone, urethane, ether, thiourethane, and thioether.

(II) A thermoplastic elastomer having a side chain having a moiety crosslinkable by hydrogen bond containing a carbonyl-containing group and a nitrogen-containing heterocycle, and another side chain having a covalently crosslinkable moiety, the thermoplastic elastomer having been crosslinked at the covalently crosslinkable moiety by at least one bond selected from the group consisting of amide, ester, lactone, urethane, ether, thiourethane, and thioether.

(III) A thermoplastic elastomer according to the above (II) in which the crosslinking at the covalently crosslinkable moiety contains tertiary amino group (—N═).

(IV) A thermoplastic elastomer according to the above (II) or (III) in which the crosslinking at the covalently crosslinkable moiety contains at least one of the structures represented by the following formulae (4) to (6):

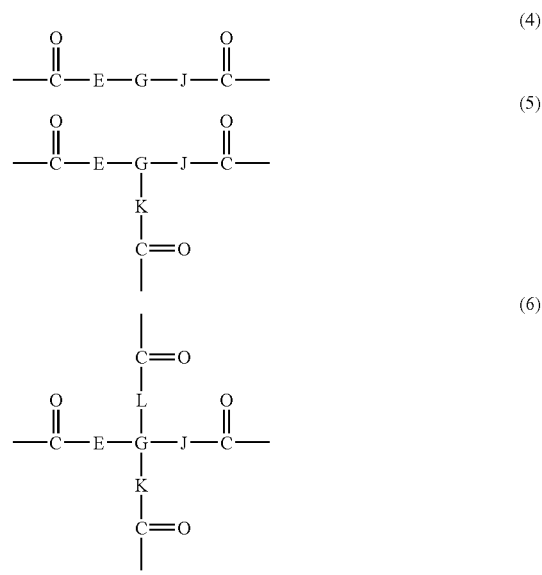

wherein E, J, K, and L are independently a single bond, oxygen atom, amino group NR' (wherein R' is hydrogen atom or an alkyl group containing 1 to 10 carbon atoms), sulfur atom, or an organic group containing such atom or group, and G is a hydrocarbon group containing 1 to 20 carbon atoms which may further contain oxygen atom, sulfur atom, or nitrogen atom and which may be branched.

(V) A thermoplastic elastomer according to the above (IV) in which the crosslinking at the covalently crosslinkable moiety contains at least one of the structures represented by the following formulae (7) to (9):

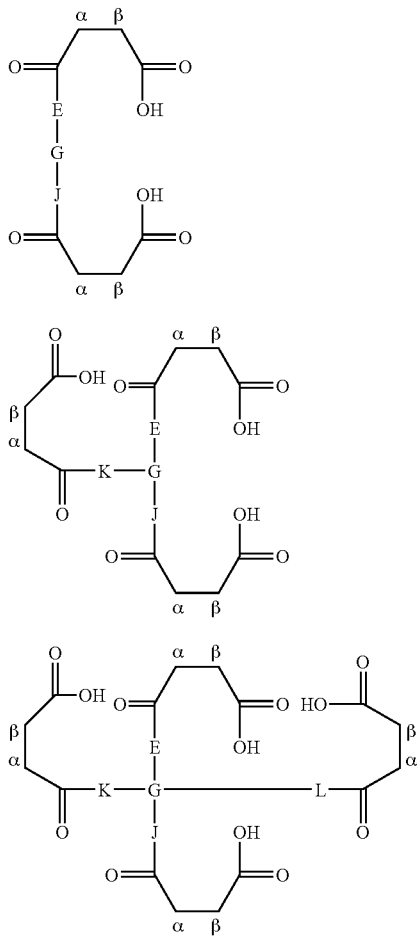

(7)

(8)

(9)

wherein E, J, K, and L are independently a single bond, oxygen atom, amino group NR' (wherein R' is hydrogen atom or an alkyl group containing 1 to 10 carbon atoms), sulfur atom, or an organic group containing such atom or group, and G is a hydrocarbon group containing 1 to 20 carbon atoms which may further contain oxygen atom, sulfur atom, or nitrogen atom and which may be branched, the structures bonding to a main chain either at α or β position.

(VI) A thermoplastic elastomer according to the above (IV) or (V) in which G contains tertiary amino group.

(VII) A thermoplastic elastomer according to any one of the above (II) to (VI) in which the crosslinking at the covalently crosslinkable moiety is formed by a reaction between a cyclic acid anhydride group with hydroxy group or amino group and/or imino group.

(VIII) A thermoplastic elastomer according to any one of the above (I) to (VII) in which the side chain having the moiety crosslinkable by hydrogen bond has a structure represented by the following formula (1):

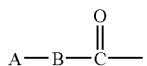

(1)

wherein A is a nitrogen containing heterocycle, and B is a single bond, oxygen atom, amino group NR' (wherein R' is hydrogen atom or an alkyl group containing 1 to 10 carbon atoms), sulfur atom, or an organic group containing such atom or group.

(IX) A thermoplastic elastomer according to the above (VIII) in which the side chain containing the moiety which can be crosslinked by hydrogen bond contains the structures represented by the following formula (2) or (3):

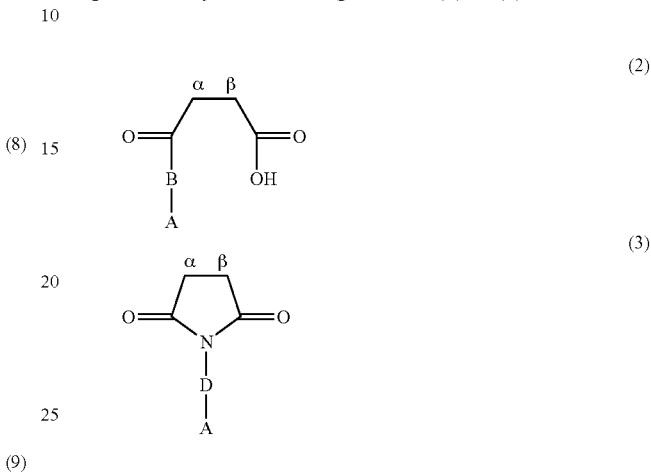

(2)

(3)

wherein A is a nitrogen containing heterocycle, and B and D are independently a single bond, oxygen atom, amino group NR' (wherein R' is hydrogen atom or an alkyl group containing 1 to 10 carbon atoms), sulfur atom, or an organic group containing such atom or group, the structures bonding to a main chain at α or β position.

(X) A thermoplastic elastomer according to any one of the above (I) to (IX) in which the nitrogen-containing heterocycle is a five- or six-membered ring.

(XI) A thermoplastic elastomer according to the above (X) wherein the nitrogen-containing heterocycle is triazole ring, thiadiazole ring, pyridine ring, imidazole ring, or hydantoin ring.

(XII) A composition containing the thermoplastic elastomer according to any one of the above (I) to (XI).

As will be described below, the present invention should be useful since it provides a thermoplastic elastomer exhibiting excellent mechanical strength without detracting from the excellent recyclability. The composition containing such thermoplastic elastomer is also very useful since the composition has the similar merits and thus valuable.

DETAILED DESCRIPTION OF THE INVENTION

Next, the present invention is described in detail.

The thermoplastic elastomer according to the first aspect of the present invention is a thermoplastic elastomer having a side chain having a moiety crosslinkable by hydrogen bond containing a carbonyl-containing group and a nitrogen-containing heterocycle, and another side chain having a covalently crosslinkable moiety, the thermoplastic elastomer being able to be crosslinked at the covalently crosslinkable moiety by at least one bond selected from the group consisting of amide, ester, lactone, urethane, ether, thiourethane, and thioether. This thermoplastic elastomer according to the first aspect of the present invention is a precursor for the thermoplastic elastomer according to the second aspect of the present invention. In other words, the thermoplastic elastomer according to the first aspect of the present invention can form the thermoplastic elastomer according to the second aspect of the present invention by reacting with the compound capable of forming a covalent bond as described below.

The thermoplastic elastomer according to the second aspect of the present invention is a thermoplastic elastomer having a side chain having a moiety crosslinkable by hydrogen bond containing a carbonyl-containing group and a nitrogen-containing heterocycle, and another side chain having a covalently crosslinkable moiety, and this elastomer has been crosslinked at the covalently crosslinkable moiety by at least one bond selected from the group consisting of amide, ester, lactone, urethane, ether, thiourethane, and thioether.

In the following description, simple reference to "the thermoplastic elastomer of the present invention" indicates the thermoplastic elastomers according to the first and the second aspects of the present invention unless otherwise noted.

The reason why the thermoplastic elastomer according to the second aspect of the present invention exhibits excellent mechanical strength while retaining excellent recyclability is not precisely known. The inventors of the present invention, however, believe that the reason is as described below.

Since the thermoplastic elastomer has a side chain having a moiety crosslinkable by hydrogen bond containing a carbonyl-containing group and a nitrogen-containing heterocycle, simultaneously with another side chain having a covalently crosslinkable moiety, the thermoplastic elastomer has crosslinking formed by the covalent bond at the covalent crosslinking moiety simultaneously with the hydrogen bond (an interaction) between the carbonyl-containing group and the nitrogen-containing heterocycle. This should have resulted in the improved mechanical strength attained without loosing the excellent recyclability.

The thermoplastic elastomer of the present invention has a side chain having a moiety crosslinkable by hydrogen bond containing a carbonyl-containing group and a nitrogen-containing heterocycle, simultaneously with another side chain having a covalently crosslinkable moiety in an elastomeric polymer which is a natural macromolecule or a synthetic macromolecule.

In the present invention, the "side chain" is a side chain or a terminal of the elastomeric polymer.

The "side chain having a moiety crosslinkable by hydrogen bond containing a carbonyl-containing group and a nitrogen-containing heterocycle" means that a carbonyl-containing group and a nitrogen-containing heterocycle are bonded to the atom (which is typically carbon atom) forming the main chain of the elastomeric polymer by a chemically stable bond (covalent bond) to constitute a moiety crosslinkable by hydrogen bond; and "another side chain having a covalently crosslinkable moiety" means that a covalently crosslinkable moiety (a functional group capable of generating at least one bond selected from the group consisting of amide, ester, lactone, urethane, ether, thiourethane, and thioether by reacting with a "compound capable of forming a covalent bond" such as an amino group-containing compound described later) is bonded to the atom (which is typically carbon atom) forming the main chain of the elastomeric polymer by a chemically stable bond (covalent bond).

The elastomeric polymer which forms the main chain of the thermoplastic elastomer of the present invention is not particularly limited as long as it is a polymer which is a natural or synthetic macromolecule having a glass transition temperature of up to room temperature (25° C.), namely, an elastomer.

Exemplary such elastomeric polymers include natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), ethylene-propylene-diene rubber (EPDM) and other diene rubbers and their hydrogenated products; ethylene-propylene rubber (EPM), ethylene-acrylic rubber (AEM), ethylene-butene rubber (EBM), chlorosulfonated polyethylene, acrylic rubber, fluororubber, polyethylene rubber, polypropylene rubber, and other olefin rubbers; epichlorohydrin rubbers; polysulfide rubbers; silicone rubbers; and urethane rubbers.

The elastomeric polymer as mentioned above may be an elastomeric polymer containing a resin component. Exemplary such elastomeric polymers include optionally hydrogenated polystylene elastomeric polymers (for example, SBS, SIS, and SEBS), polyolefin elastomeric polymers, polyvinyl chloride elastomeric polymers, polyurethane elastomeric polymers, polyester elastomeric polymers, and polyamide elastomeric polymers.

The elastomeric polymer as mentioned above may be either a liquid or solid and may have a non-limited molecular weight, and these factors may be adequately selected depending on the application of the thermoplastic elastomer of the present invention and the composition containing such thermoplastic elastomer of the present invention (hereinafter sometimes referred together as "the thermoplastic elastomer (composition) of the present invention") and the physical property desired therefor.

When fluidity of the thermoplastic elastomer (composition) of the present invention after heating (de-crosslinking) is important, the elastomeric polymer is preferably liquid, and in the case of diene rubber such as isoprene rubber or butadiene rubber, the weight average molecular weight is preferably in the range of 1,000 to 100,000, and more preferably in the range of approximately 1,000 to 50,000.

On the other hand, when strength of the thermoplastic elastomer (composition) of the present invention is important, the elastomeric polymer is preferably solid, and in the case of diene rubber such as isoprene rubber or butadiene rubber, the weight average molecular weight is preferably at least 100,000, and more preferably in the range of approximately of 500,000 to 1,500,000.

In the present invention, the weight average molecular weight is the weight average molecular weight (calculated in terms of polystylene) measured by gel permeation chromatography (GPC). In the measurement, the solvent used is preferably tetrahydrofuran (THF).

In the present invention, the elastomeric polymers used may be a mixture of two or more of the elastomeric polymers as mentioned above. In such a case, the mixing ratio of the elastomeric polymers may be adequately selected depending on the application of the thermoplastic elastomer (composition) of the present invention, physical properties required for the thermoplastic elastomer (composition) of the present invention, and the like.

The glass transition temperature of the elastomeric polymer is preferably up to 25° C. as described above, and when the elastomeric polymer has two or more glass transition temperatures or when a mixture of two or more elastomeric polymer is used, at least one of the glass transition temperatures is preferably up to 25° C. This is preferable since the article molded from the thermoplastic elastomer (composition) of the present invention will exhibit rubber elasticity at room temperature when the glass transition temperature of the elastomeric polymer is within such range.

In the present invention, the glass transition temperature is the one measured by using differential scanning calorimetry (DSC). The temperature elevation speed is preferably 10° C./min.

Such elastomeric polymer is preferably a diene rubber such as natural rubber (NR), isoprene rubber (IR), butadiene rubber (BR), 1,2-butadiene rubber, styrene-butadiene rubber (SBR), ethylene-propylene-diene rubber (EPDM), or butyl rubber (IIR); or an olefin rubber such as ethylene-propylene rubber (EPM), ethylene-acrylic rubber (AEM), or ethylene-butene rubber (EBM), since such rubber exhibit a glass transition temperature of up to 25° C. and the article molded from the thermoplastic elastomer (composition) of the present invention exhibits rubber elasticity at room temperature. When an olefin rubber is employed, the resulting thermoplastic elastomer (composition) of the present invention will exhibit an improved tensile strength after crosslinking, and deterioration of the composition will be suppressed due to the absence of the double bond.

In the present invention, amount of styrene bonded in the case of the styrene-butadiene rubber (SBR), or degree of hydrogenation in the case of the hydrogenated elastomeric polymer is not particularly limited, and such parameters may be adequately adjusted depending on the application of the thermoplastic elastomer (composition) of the present invention, physical properties required for the thermoplastic elastomer (composition) of the present invention, and the like.

When the main chain of the elastomeric polymer is ethylene-propylene-diene rubber (EPDM), ethylene-acrylic rubber (AEM), ethylene-propylene rubber (EPM), or ethylene-butene rubber (EBM), the ethylene content is preferably 10 to 90% by mole, and more preferably 40 to 90% by mole. When the ethylene content is within such range, the resulting thermoplastic elastomer (composition) will enjoy satisfactory compression set and mechanical strength, and in particular, excellent tensile strength.

The thermoplastic elastomer of the present invention has a side chain having a moiety crosslinkable by hydrogen bond containing a carbonyl-containing group and a nitrogen-containing heterocycle and another side chain having a covalently crosslinkable moiety on the elastomeric polymer as described above.

Next, each side chain is described in detail.

[Side Chain Having Moiety Crosslinkable by Hydrogen Bond]

The side chain having the moiety crosslinkable by hydrogen bond is not limited as long as it is a side chain having a carbonyl-containing group and a nitrogen-containing heterocycle.

The carbonyl-containing group is not particularly limited as long as it contains carbonyl group, and exemplary carbonyl-containing groups include amide, ester, imide, carboxy group, and carbonyl group. The compound capable of introducing such group is not particularly limited, and exemplary compounds include, ketone, carboxylic acid, and derivatives thereof.

Examples of the carboxylic acid include organic acids having a saturated or unsaturated hydrocarbon group which may be any of aliphatic, alicyclic, and aromatic hydrocarbon group. Examples of the derivative of the carboxylic acid include carboxylic acid anhydrides, amino acids, thiocarboxylic acids (mercapto group-containing carboxylic acids), esters, amino acids, ketones, amides, imides, and dicarboxylic acids and monoesters threreof.

Exemplary carboxylic acids and their derivatives include malonic acid, maleic acid, succinic acid, glutaric acid, phthalic acid, isophthalic acid, terephthalic acid, p-phenylenediacetic acid, p-hydroxybenzoic acid, p-aminobenzoic acid, mercaptoacetic acid, and other carboxylic acids, as well as substituted such carboxylic acids; succinic anhydride, maleic anhydride, glutaric anhydride, phthalic anhydride, propionic anhydride, benzoic anhydride, and other acid anhydrides; esters of maleic acid, esters of malonic acid, esters of succinic acid, esters of glutaric acid, ethyl acetate, and other aliphatic esters; esters of phthalic acid, esters of isophthalic acid, esters of terephthalic acid, ethyl-m-aminobenzoate, methyl-p-hydroxybenzoate, and other aromatic esters; quinone, anthraquinone, naphthoquinone, and other ketones; glycine, tyrosine, vicine, alanine, valine, leucine, serine, threonine, lysine, aspartic acid, glutamic acid, cysteine, methionine, proline, N-(p-aminobenzoyl)-β-alanine, and other amino acids; maleamide, maleamic acid (maleicmonoamide), succinicmonoamide, 5-hydroxyvaleramide, N-acetyl ethanolamine, N,N'-hexamethylenebis(acetamide), malonamide, cycloserine, 4-acetamidophenol, p-acetamide benzoic acid, and other amides; maleimide, succinimide, and other imides.

Among these, the compound capable of introducing carbonyl group (carbonyl-containing group) is preferably succinic anhydride, maleic anhydride, glutaric anhydride, phthalic anhydride, or other cyclic acid anhydride, and more preferably maleic anhydride.

The nitrogen-containing heterocycle in the side chain of the thermoplastic elastomer is introduced in the main chain either directly or with an intervening organic group.

The nitrogen-containing heterocycle may be the one containing a hetero atom such as sulfur atom, oxygen atom, or phosphorus atom other than the nitrogen atom in the heterocycle as long as it contains nitrogen atom in the heterocycle. Such heterocycle compound is used since the hydrogen bond forming the crosslinking is strengthened by the heterocycle structure and the resulting thermoplastic elastomer (composition) of the present invention will exhibit an improved tensile strength.

The nitrogen-containing heterocycle may also be substituted, and exemplary substituents include methyl group, ethyl group, (iso)propyl group, hexyl group, and other alkyl groups; methoxy group, ethoxy group, (iso)propoxy group, and other alkoxy groups; groups comprising halogen atom such as fluorine atom, chlorine atom, bromine atom, and iodine atom; cyano group; amino group; aromatic hydrocarbon group; ester group; ether group; acyl group; and thioether group, and these groups may also be used in combination. The position of substitution by the substituent is not particularly limited, and the number of the substituent is also not limited.

The nitrogen-containing heterocycle may be aromatic and need not be aromatic. However, the nitrogen-containing heterocycle is preferably aromatic since the resulting thermoplastic elastomer (composition) of the present invention will enjoy high tensile strength as well as improved mechanical strength.

The nitrogen-containing heterocycle is preferably a five-membered ring or a six-membered ring.

Exemplary such nitrogen-containing heterocycles include pyrrololine, pyrrolidone, oxindole (2-oxindole), indoxyl (3-oxindole), dioxindole, isatin, indolyl, phthalimidine, β-isoindigo, monoporphyrin, diporphyrin, triporphyrin, azaporphyrin, phthalocyanine, hemoglobin, uroporphyrin, chlorophyll, phyloerythrin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindol, purine, cinnoline, pyrrole, pyrroline, indole, indorine, carbazole, phenothiazine, indolenine, isoindole, oxazole, thiazole, isoxazole, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzisoxazole, anthranyl, benzothiazole, benzofurazan, pyridine, quinoline, isoquinoline, acridine, phenanthridine, anthrazoline, naphthyridine, thiazine, pyridazine, pyrimidine, quinazoline, quinoxaline, triazine, histidine, triazolidine, melamine, adenine, guanine, thymine, cytosine, and derivatives thereof. Among these, the particularly preferred of the nitrogen-containing five-membered rings are the following compounds, the triazole derivative represented by the following formula (10), and the imidazole derivative represented by the following formula (11). These groups may be optionally substituted with various substituents as described above, and they may also be hydrogenated or dehydrogenated.

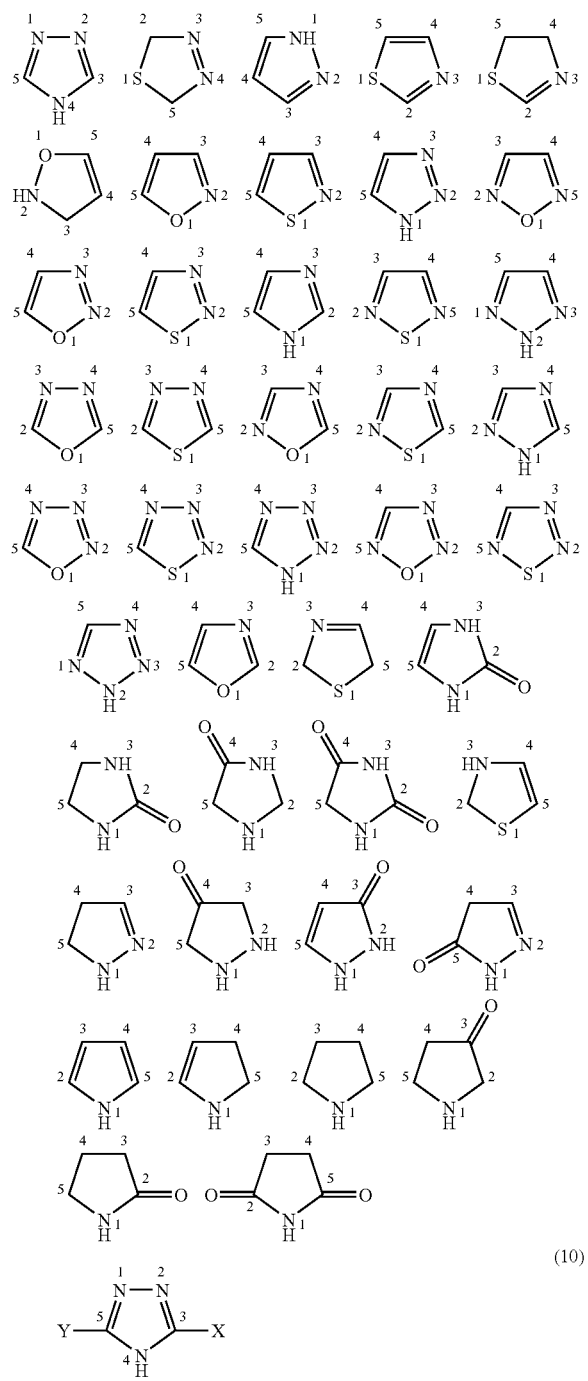

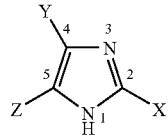

In the formulae, substituents X, Y, and Z are independently hydrogen atom, an alkyl group containing 1 to 30 carbon atoms, an aralkyl group containing 7 to 20 carbon atoms, an aryl group containing 6 to 20 carbon atoms, or amino group, with the proviso that one of X and Y in (10) is not hydrogen atom, and similarly, at least one of X, Y, and Z is not hydrogen atom.

More specifically, the substituents X, Y, and Z may be hydrogen atom; amino group; or a straight chain alkyl group such as methyl group, ethyl group, propyl group, butyl group, pentyl group, octyl group, dodecyl group, or stearyl group; a branched alkyl group such as isopropyl group, isobutyl group, s-butyl group, t-butyl group, isopentyl group, neopentyl group, t-pentyl group, 1-methylbutyl group, 1-methylheptyl group, or 2-ethylhexyl group; an aralkyl group such as benzyl group or phenethyl group; or an aryl group such as phenyl group, tolyl group (o-, m-, or p-), dimethylphenyl group, or mesityl group.

Among these, the preferred are alkyl groups, and in particular, butyl group, octyl group, dodecyl group, isopropyl group, and 2-ethylhexyl group in view of the favorable workability of the resulting thermoplastic elastomer (composition) of the present invention.

With regard to the nitrogen-containing six-membered ring, the preferred are the compounds as shown below. These compounds may also have the substituents as described above, and they may also be hydrogenated or dehydrogenated.

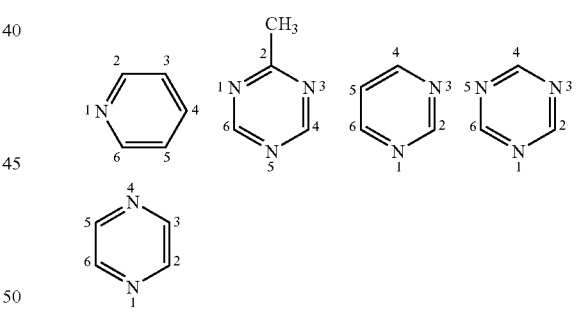

Condensation product of the nitrogen-containing heterocycle with benzene ring or condensation product of nitrogen-containing heterocycle with another nitrogen-containing heterocycle may also be employed. Exemplary condensed rings are shown below. These condensed rings may also have the substituents as described above, and they may also be hydrogenated or dehydrogenated.

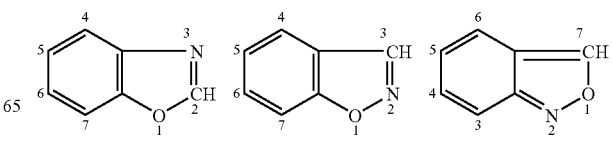

-continued

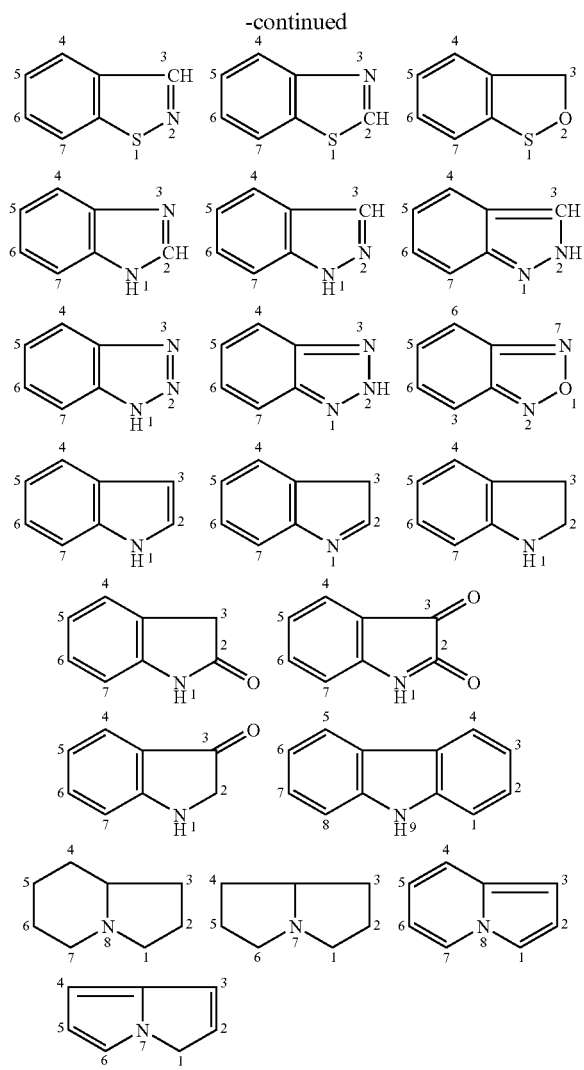

Among such nitrogen-containing heterocycles, the preferred are triazole ring, pyridine ring, thiadiazole ring, imidazole ring, and hydantoin ring since the resulting thermoplastic elastomer (composition) of the present invention will enjoy excellent recyclability, compression set, hardness, mechanical strength, and in particular, tensile strength.

The thermoplastic elastomer of the present invention may have the carbonyl-containing group and the nitrogen-containing heterocycle in separate side chains of the main chain. However, the carbonyl-containing group and the nitrogen-containing heterocycle are preferably bonded by an intervening group in one side chain of the main chain, and more preferably, the carbonyl-containing group and the nitrogen-containing heterocycle are bonded to the main chain as the side chain represented by the following formula (1).

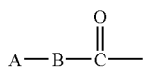
(1)

In the formula, A is a nitrogen-containing heterocycle, and B is a single bond, oxygen atom, amino group NR' (wherein R' is hydrogen atom or an alkyl group containing 1 to 10 carbon atoms), sulfur atom, or an organic group containing such atom or group.

The nitrogen-containing heterocycle A may be the nitrogen-containing heterocycle as mentioned above.

The substituent B may be a single bond; oxygen atom, sulfur atom, or amino group NR' (wherein R' is hydrogen atom or an alkyl group containing 1 to 10 carbon atoms); an alkylene group or an aralkylene group containing 1 to 20 carbon atoms optionally containing such atom or group; an alkylene ether group (an alkyleneoxy group such as —O—CH$_2$CH$_2$— group), an alkyleneamino group (for example, —NH—CH$_2$CH$_2$— group), or an alkylene thioether group (an alkylenethio group such as —S—CH$_2$CH$_2$— group) containing 1 to 20 carbon atoms containing such atom or group on its terminal; or an aralkylene ether group (aralkyleneoxy group), an aralkylene amino group, or an aralkylene thioether group 1 to 20 carbon atoms containing such atom or group on its terminal.

Examples of the alkyl group containing 1 to 10 carbon atoms of the amino group NR' include methyl group, ethyl group, propyl group, butyl group, pentyl group, hexyl group, heptyl group, octyl group, nonyl group, decyl group, and their isomers.

The oxygen atom, the sulfur atom, and the amino group NR' of the substituent B; and the oxygen atom, the sulfur atom, and the amino group NR' of the alkylene ether group, the alkyleneamino group, the alkylene thioether group, the aralkylene ether group, the aralkylene amino group, and the aralkylene thioether group containing 1 to 20 carbon atoms containing such atom or group on its terminal is preferably combined with the adjacent carbonyl group to form a conjugated ester group, amide group, imide group, thioester group, or the like.

Among these, the substituent B is preferably oxygen atom, sulfur atom, or amino group which forms conjugated system; or an alkylene ether group, an alkyleneamino group, or an alkylene thioether group containing 1 to 20 carbon atoms having such atom or group at its terminal, and more preferably, amino group (NH), an alkyleneamino group (—NH—CH$_2$— group, —NH—CH$_2$CH$_2$— group or —NH—CH$_2$CH$_2$CH$_2$— group), or an alkylene ether group (—O—CH$_2$— group, —O—CH$_2$CH$_2$— group, or —O—CH$_2$CH$_2$CH$_2$— group).

The carbonyl-containing group and the nitrogen-containing heterocycle are preferably included in one side chain represented by the following formula (2) or (3), and incorporated in the polymer main chain at the α or β position of the side chain.

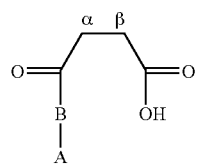
(2)

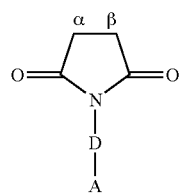
(3)

In the formulae, A is a nitrogen containing heterocycle, and B and D are independently a single bond, oxygen atom, amino group NR' (wherein R' is hydrogen atom or an alkyl group containing 1 to 10 carbon atoms), sulfur atom, or an organic group containing such atom or group.

In the formulae, the nitrogen-containing heterocycle A is basically as defined above for the nitrogen-containing heterocycle A in formula (1), and the substituents B and D are independently as defined above for the substituent B in formula (1).

However, of the exemplary substituents mentioned for the substituent B in the formula (1), the substituent D in the formula (3) is preferably single bond or the one capable of forming a conjugated system such as an alkylene group or an aralkylene group containing 1 to 20 carbon atoms optionally containing oxygen atom, nitrogen atom, or sulfur atom, and more preferably, single bond. In other words, the substituent D preferably forms an alkyleneamino group or an aralkylene amino group containing 1 to 20 carbon atoms optionally containing oxygen atom, nitrogen atom or sulfur atom with the imide nitrogen in the formula (3), and more preferably, the nitrogen-containing heterocycle is bonded directly (i.e. by single bond) to the imide nitrogen in the formula (3). Examples of the substituent D include single bond; the alkylene ether or the aralkylene ether group containing 1 to 20 carbon atoms optionally containing oxygen atom, sulfur atom, or amino atom on its terminal; and methylene group, ethylene group, propylene group, butylene group, hexylene group, phenylene group, or xylylene group including their isomers.

The ratio of the carbonyl-containing group and the nitrogen-containing heterocycle in the thermoplastic elastomer is not paricularly limited. However, the closer to 2:1 (1:1 in the case of the imide structure of the formula (3)) the ratio becomes the better in view of the ease of complementary interaction and ease of production.

The side chain containing the moiety crosslinkable by hydrogen bond having such carbonyl-containing group and such nitrogen-containing heterocycle is preferably incorporated at a proportion (introduction rate) of 0.1 to 50% by mole, more preferably at 0.2 to 30% by mole, and further more preferably at 1 to 30% by mole per 100% by mole of the main chain moiety.

When the introduction rate of such side chain is less than 0.1% by mole, tensile strength after the crosslinking may be insufficient, and when the proportion is in excess of 50% by mole, crosslinking density may become high to result in the loss of rubber elasticity. When the introduction rate is within the above described range, efficient crosslinking between the molecules will take place by the interaction between the side chains of the thermoplastic elastomer, and the tensile strength after the crosslinking will be sufficiently high and the recyclability will also be sufficient.

When the carbonyl-containing group and the nitrogen-containing heterocycle are independently introduced, the introduction rate may be calculated on the bases of the combination of the carbonyl-containing group and the nitrogen-containing heterocycle depending on the proportion of the carbonyl-containing group and the nitrogen-containing heterocycle, and when either group is present in excess of the other group, the rate may be calculated on the bases of the group at a higher content.

For example, when the main chain moiety is ethylene-propylene rubber (EPM), the introduction rate is such that the monomer introduced in the side chain moiety is approximately 0.1 to 50 units per 100 units of the ethylene and propylene monomer units.

[Side Chain Having Covalently Crosslinkable Moiety]

The side chain having covalently crosslinkable moiety is not particularly limited as long as it has a functional group which can form at least one bond selected from amide, ester, lactone, urethane, ether, thiourethane, and thioether by reacting with a "compound capable of forming covalent bond" as the covalently crosslinkable moiety.

In the present invention, examples of the "compound capable of forming covalent bond" include a polyamine compound having two or more amino group and/or imino group in one molecule (two or more in total of amino and imino groups in one molecule when both the amino group and the imino groups are included in the molecule); a polyol compound having two or more hydroxy group in one molecule; a polyisocyanate compound having two or more isocyanate (NCO) group in one compound; and polythiol compound having two or more thiol group (mercapto group) in one molecule.

Exemplary polyamine compounds include alicyclic amines, aliphatic polyamines, aromatic polyamines, and nitrogen-containing heterocyclic amines as described below.

Exemplary alicyclic amines include 1-amino-3-aminomethyl-3,5,5-trimethylcyclohexane, bis-(4-aminocyclohexyl)methane, diaminocyclohexane, and di-(aminomethyl)cyclohexane.

Exemplary aliphatic polyamines include methylenediamine, ethylenediamine, propylenediamine, 1,2-diaminopropane, 1,3-diaminopentane, hexamethylenediamine, diaminoheptane, diaminododecane, diethylenetriamine, diethylaminopropylamine, N-aminoethylpiperazine, triethylenetetramine, N,N'-dimethyl ethylenediamine, N,N'-diethyl ethylenediamine, N,N'-diisopropyl ethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, and N,N',N"-trimethylbis(hexamethylene)triamine.

Exemplary aromatic polyamines and nitrogen-containing heterocycle amines include diaminotoluene, diaminoxylene, tetramethylxylylenediamine, tris(dimethylaminomethyl)phenol, metaphenylenediamine, diaminodiphenylmethane, diaminodiphenylsulfone, and 3-amino-1,2,4-triazole.

The polyamine compound may have at least one of its hydrogen atoms substituted with an alkyl group, an alkylene group, an aralkylene group, oxy group, an acyl group, a halogen atom, or the like. The polyamine compound may also contain a hetero atom such as oxygen atom or sulfur atom in its skeleton.

In addition, the polyamine compound may be used either alone or in combination of two or more. When two or more polyamine compounds are used, they may be mixed at a ratio adequately selected depending on the application of the thermoplastic elastomer (composition) of the present invention, physical properties required for the thermoplastic elastomer (composition) of the present invention, and the like.

Of the polyamine compound as mentioned above, the preferred are hexamethylenediamine, N,N'-dimethyl-1,6-hexanediamine, and diaminodiphenylsulfone in view of their excellent effect in improving compression set, mechanical strength, and in particular, tensile strength.

The polyol compound is not particularly limited for its molecular weight, skeleton or the like as long as it contains two or more hydroxy groups, and exemplary polyol compounds include polyether polyols, polyester polyols, other polyols, and mixtures thereof as described below.

Exemplary polyether polyols include polyols produced by adding at least one member selected from ethylene oxide, propylene oxide, buthylene oxide, styrene oxide, and the like to at least one member selected from polyhydric alcohols such as ethylene glycol, diethylene glycol, propylene glycol, dipropylene glycol, glycerin, 1,1,1-trimethylol propane, 1,2,5-hexanetriol, 1,3-butanediol, 1,4-butanediol, 4,4'-dihydroxy phenyl propane, 4,4'-dihydroxy phenyl methane, and pentaerythritol; polyoxytetramethylene oxide; and the like which may be used alone or in combination of two or more.

Exemplary polyester polyols include condensation polymers of one or two of ethyleneglycol, propylene glycol, butanediol, pentanediol, hexanediol, cyclohexane dimethanol, glycerin, 1,1,1-trimethylolpropane, and other low molecular weight polyols with one or two of glutaric acid, adipic acid, pimelic acid, suberic acid, sebacic acid, terephthalic acid, isophthalic acid, dimer acid, and other low molecular weight carboxylic acid, or one or two of oligomeric acids; and products by ring-opening polymerization of propione lactone, valerolactone or the like; which may be used alone or in combination of two or more.

Exemplary other polyols include polymer polyol, polycarbonate polyol; polybutadiene polyol; hydrogenated polybutadiene polyol; acrylic polyol; ethylene glycol, diethylene glycol, propylene glycol, dipropylene glycol, butanediol, pentanediol, hexanediol, polyethylene glycol laurylamine (for example, N,N-bis(2-hydroxyethyl)laurylamine), polypropylene glycol laurylamine (for example, N,N-bis(2-methyl-2-hydroxyethyl)laurylamine) and polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), polypropylene glycol stearylamine (for example, N,N-bis(2-methyl-2-hydroxyethyl)stearyl amine) and other low molecular weight polyols, which may be used alone or in combination of two or more.

Exemplary polyisocyanate compounds include diisocyanate compounds such as 2,4-tolylene diisocyanate (2,4-TDI), 2,6-tolylene diisocyanate (2,6-TDI), 4,4'-diphenylmethan diisocyanate (4,4'-MDI), 2,4'-diphenylmethan diisocyanate (2,4'-MDI), 1,4-phenylene diisocyanate, xylylene diisocyanate (XDI), tetramethylxylylene diisocyanate (TMXDI), tolidine diisocyanate (TODI), 1,5-naphthalene diisocyanate (NDI), and other aromatic polyisocyanates; hexamethylene diisocyanate (HDI), trimethylhexamethylene diisocyanate (TMHDI), lysine diisocyanate, norbornane diisocyanate (NBDI), and other aliphatic polyisocyanates; transcyclohexane-1,4-diisocyanate, isophorone diisocyanate (IPDI), $H_6XDI$ (hydrogenated XDI), $H_{12}MDI$ (hydrogenated MDI), $H_6TDI$ (hydrogenated TDI), and other alicyclic polyisocyanates; and polymethylene polyphenylene polyisocyanate and other polyisocyanate compounds; carbodiimide-modified polyisocyanates of such isocyanate compounds; isocyanurate-modified polyisocyanates of such isocyanate compounds; urethane prepolymers produced by reacting such an isocyanate compound with a polyol compound as described above; and the like, which may be used alone or in combination of two or more.

The polythiol compound is not limited for its molecular weight, skeleton or the like as long as it has two ore more thiol groups. Exemplary polythiol compounds include methanedithiol, 1,3-butanedithiol, 1,4-butanedithiol, 2,3-butanedithiol, 1,2-benzenedithiol, 1,3-benzenedithiol, 1,4-benzenedithiol, 1,10-decanedithiol, 1,2-ethanedithiol, 1,6-hexanedithiol, 1,9-nonanedithiol, 1,8-octanedithiol, 1,5-pentanedithiol, 1,2-propanedithiol, 1,3-propanedithiol, toluene-3,4-dithiol, 3,6-dichloro-1,2-benzenedithiol, 1,5-naphthalenedithiol, 1,2-benzenedimethanethiol, 1,3-benzenedimethanethiol, 1,4-benzenedimethanethiol, 4,4'-thiobisbenzenethiol, 2,5-dimercapto-1,3,4-thiadiazole, 1,8-dimercapto-3,6-dioxaoctane, 1,5-dimercapto-3-thiapentane, 1,3,5-triazine-2,4,6-trithiol (trimercapto-triazine), 2-di-n-butylamino-4,6-dimercapto-s-triazine, trimethylolpropane tris (β-thiopropionate), trimethylolpropane tris(thioglycolate), and polythiol (thiocol or thiol-modified macromolecule (resin, rubber, etc.), which may be used alone or in combination of two or more.

Examples of the preferable functional group capable of generating at least one bond selected from the group consisting of amide, ester, lactone, urethane, ether, thiourethane, and thioether by reacting with such "compound capable of forming a covalent bond" include cyclic acid anhydride group, hydroxy group, amino group, carboxy group, isocyanate group, and thiol group.

The side chain having covalently crosslinkable moiety is not particularly limited as long as it has such functional group.

The thermoplastic elastomer according to the second aspect of the present invention has at least one crosslinking at the covalently crosslinkable moiety, namely, at least one the crosslinking formed by the covalent bonding between the functional group as described above and the "covalently crosslinkable compound" in one molecule. In particular, when the crosslinking is formed by at least one bond selected from the group consisting of amide, ester, lactone, urethane, ether, thiourethane, and thioether, the thermoplastic elastomer preferably has at least 2 crosslinkings, more preferably 2 to 20 crosslinkings, and further more preferably 2 to 10 crosslinkings.

In the present invention, the crosslinking at the covalently crosslinkable moiety preferably contains tertiary amino group (—N=) in view of the improved compression set and mechanical strength (elongation at break and tensile strength at break) of the resulting thermoplastic elastomer (composition). Such favorable properties are believed to have been achieved by the increase of the crosslinking density by the hydrogen bond (an interaction) between the tertiary amino group with the carbonyl-containing group and the nitrogen-containing heterocycle. Accordingly, among those exemplified above, the "covalently crosslinkable compound" is preferably polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), or polypropylene glycol stearylamine (for example, N,N-bis(2-methyl-2-hydroxyethyl)stearylamine).

In the present invention, the crosslinking at the covalently crosslinkable moiety preferably contains at least one of the structures represented by the following formulae (4) to (6), and G in these formulae preferably has tertiary amino group.

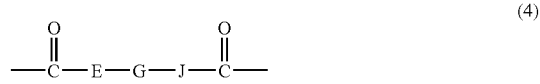

(4)

-continued

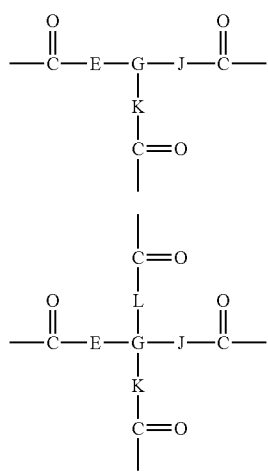

(5)

(6)

In the formulae, E, J, K, and L are independently a single bond, oxygen atom, amino group NR' (wherein R' is hydrogen atom or an alkyl group containing 1 to 10 carbon atoms), sulfur atom, or an organic group containing such atom or group; and G is a hydrocarbon group containing 1 to 20 carbon atoms which may optionally contain oxygen atom, sulfur atom, or nitrogen atom, and which may be branched.

The substituents E, J, K, and L are independently and basically the same as the substituent B in the formula (1).

Examples of the substituent G include methylene group, ethylene group, 1,3-propylene group, 1,4-butylene group, 1,5-pentylene group, 1,6-hexylene group, 1,7-heptylene group, 1,8-octylene group, 1,9-nonylene group, 1,10-decylene group, 1,11-undecylene group, 1,12-dodecylene group, and other alkylene groups; N,N-diethyl dodecylamine-2,2'-diyl, N,N-dipropyl dodecylamine-2,2'-diyl, N,N-diethyl octylamine-2,2'-diyl, N,N-dipropyloctylamine-2,2'-diyl, N,N-diethyl stearylamine-2,2'-diyl, N,N-dipropyl stearyl amine-2,2'-diyl, vinylene group, 1,4-cyclohexylene group and other divalent alicyclic hydrocarbon groups; 1,4-phenylene group, 1,2-phenylene group, 1,3-phenylene group, 1,3-phenylene bis(methylene)group, and other divalent aromatic hydrocarbon groups; propane-1,2,3-triyl, butane-1,3,4-triyl, trimethylamine-1,1',1''-triyl, triethylamine-2,2',2''-triyl and other trivalent hydrocarbon groups; tetravalent hydrocarbon groups represented by the following formulae (12) and (13); and the substituents formed by combining the foregoing substituents.

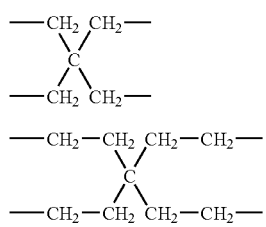

(12)

(13)

In the present invention, it is preferable that the crosslinking at the covalently crosslinkable moiety contains at least one of the structures represented by the following formulae (7) to (9) which bonds to the elastomeric polymer main chain at α or β position, and more preferable that G in the formula contains tertiary amino group.

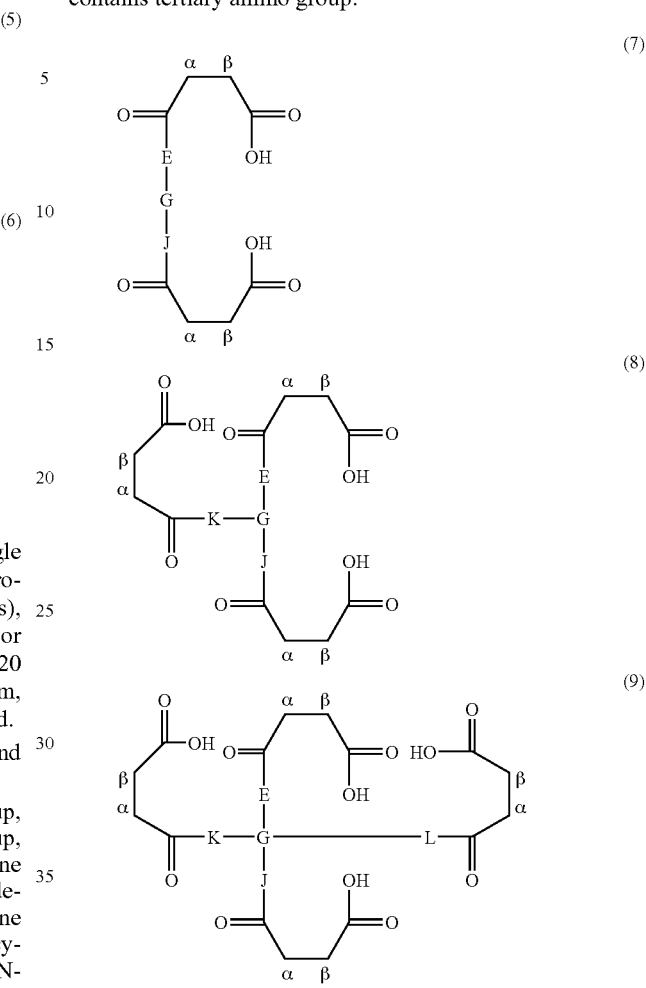

(7)

(8)

(9)

In the formulae, substituents E, J, K, and L are independently the same as substituent E, J, K, and L in the formulae (4) to (6), and substituent G is basically the same as the substituent G in the formula (4).

Examples of the preferable structures represented the following formulae (7) to (9) include the compounds represented by the following formulae (14) to (25).

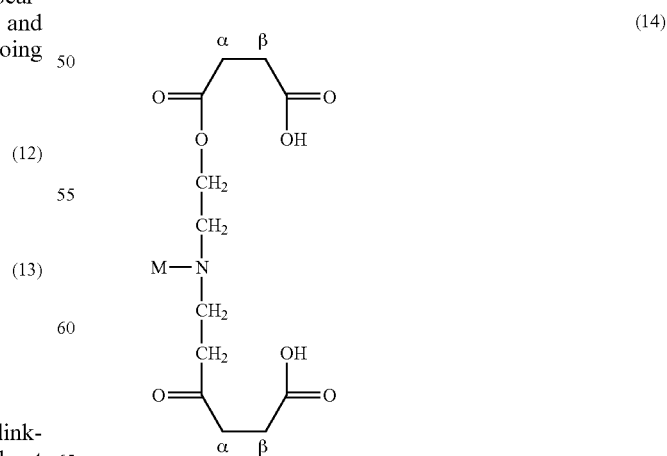

(14)

$M = C_8H_{17}, C_{12}H_{25}, C_{18}H_{37}$

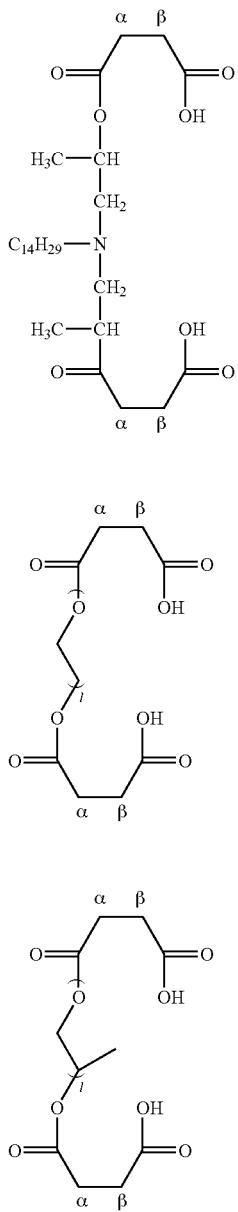
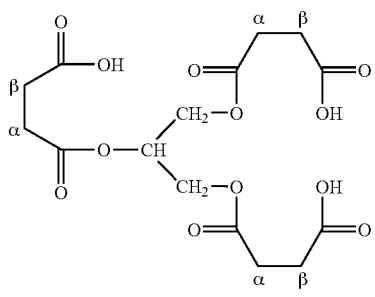
In the formula, l is an integer of at least 1.
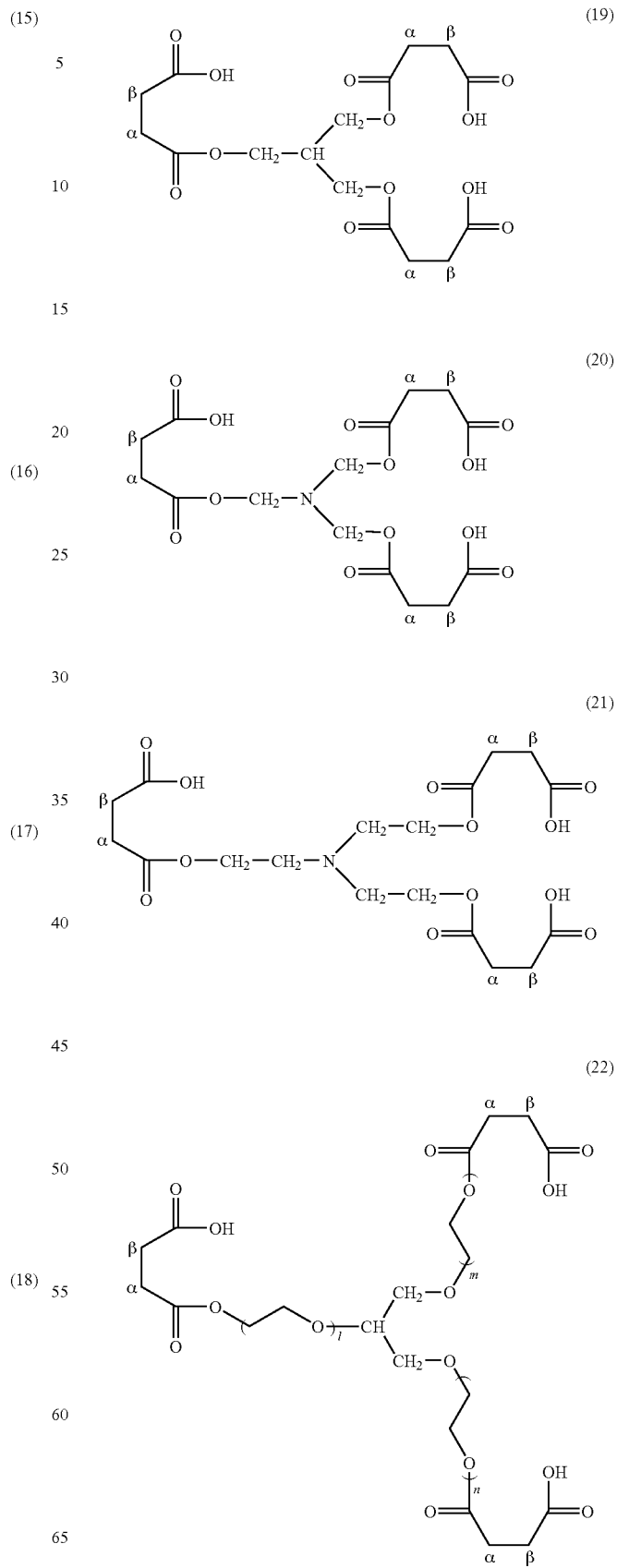

-continued

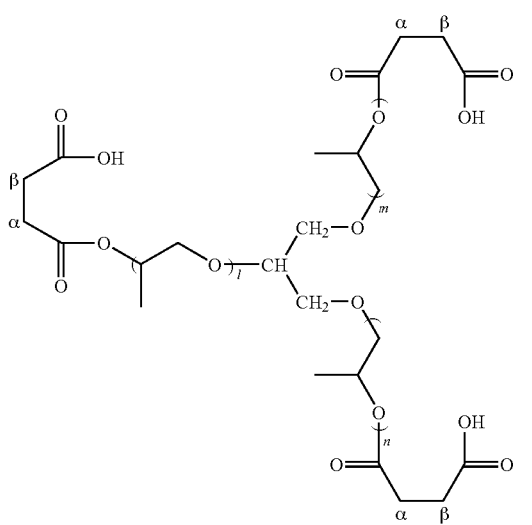
(23)

In the formula, l, m, and n are independently an integer of at least 1.

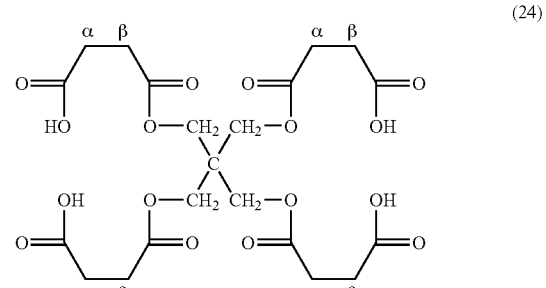
(24)

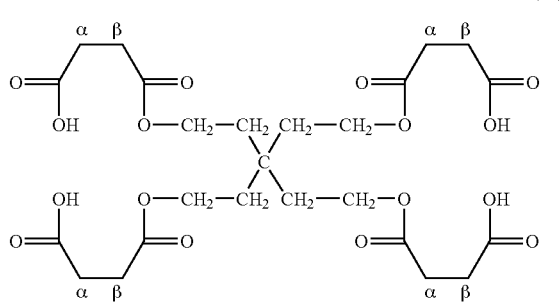
(25)

In the present invention, the crosslinking at the covalently crosslinkable moiety is preferably formed by the reaction between a cyclic acid anhydride group and hydroxy group or amino group and/or imino group.

The thermoplastic elastomer of the present invention preferably has a glass transition temperature of up to 25° C., and when the thermoplastic elastomer has two or more glass transition temperatures or when a mixture of two or more thermoplastic elastomers is used, at least one of the glass transition temperature is preferably up to 25° C. When the glass transition temperature is up to 25° C., the article molded from such thermoplastic elastomer will exhibit rubber elasticity at room temperature.

The method used in producing the thermoplastic elastomer according to the first aspect of the present invention is not particularly limited, and any method commonly used in the art may be employed. An exemplary preferable method comprises a reaction step wherein an elastomeric polymer having a cyclic acid anhydride group in its side chain is reacted with a compound capable of introducing the nitrogen-containing heterocycle (This step is hereinafter referred to as the "reaction step A").

This reaction step A is a step wherein the compound capable of introducing the nitrogen-containing heterocycle and the elastomeric polymer having a cyclic acid anhydride group in its side chain are mixed at a temperature (for example, 80 to 200° C.) that allows chemical binding of such compound with the cyclic acid anhydride group to promote the reaction (ring opening of the cyclic acid anhydride group). By this reaction, the side chain of the resulting thermoplastic elastomer will have the structure represented by the formula (2) or (3).

In the reaction step A, the compound capable of introducing a nitrogen-containing heterocycle is preferably reacted with a part of the cyclic acid anhydride group in the elastomeric polymer having the cyclic acid anhydride group in its side chain since the unreacted cyclic acid anhydride group will then be the covalently crosslinkable moiety. In this case, "a part" preferably means at least 1% by mole, more preferably at least 30% by mole, and further more preferably at least 50% by mole in relation to 100% by mole of the cyclic acid anhydride group. Within such range, the nitrogen-containing heterocycle introduced will be capable of exerting its effect, and recyclability will be improved.

The "elastomeric polymer having a cyclic acid anhydride group in its side chain" is an elastomeric polymer wherein the cyclic acid anhydride group is bonded to the atom constituting the main chain of the elastomeric polymer in a chemically stable manner (by covalent bond), and such "elastomeric polymer having a cyclic acid anhydride group in its side chain" can be produced by reacting the elastomeric polymer with the compound capable of introducing the cyclic acid anhydride group.

Exemplary compounds capable of introducing the cyclic acid anhydride group include cyclic acid anhydrides such as succinic anhydride, maleic anhydride, glutaric anhydride, and phthalic anhydride, and the derivatives thereof.

The elastomeric polymer having a cyclic acid anhydride group in its side chain used may be the one produced by a method commonly used in the art, for example, by graft polymerizing the cyclic acid anhydride to the elastomeric polymer under the conditions commonly used in the art, for example, by stirring at an elevated temperature, or a commercially available product.

Exemplary commercially available products include LIR-403 (manufactured by Kuraray Co., Ltd.), LIR-410A (prototype manufactured by Kuraray Co., Ltd.), and other maleic anhydride-modified isoprene rubbers; LIR-410(manufactured by Kuraray Co., Ltd.), and other modified isoprene rubbers; Krynac 110, 221, and 231 (manufactured by Polysar) and other carboxy-modified nitrile rubbers; CPIB (manufactured by Nippon Petrochemicals Company Limited), HRPIB (prototype manufactured by the laboratory of Nippon Petrochemicals Company Limited), and other carboxy-modified polybutenes; NUCREL (manufactured by Du Pont-Mitsui Polychemicals Co., Ltd.), Yukaron (manufactured by Mitsubishi Chemical Corporation), Tafmer M (for example, MA8510 manufactured by Mitsui Chemicals, Inc.), and other maleic anhydride-modified ethylene-propylene rubbers; Tafmer M (for example, MH7020 manufactured by Mitsui Chemicals, Inc.) and other maleic anhydride-modified ethylene-butene rubbers; Adtex series (maleic anhydride-modified EVA, maleic anhydride-modified EMA manufactured by Japan Polyolefin Corporation), HPR series (maleic anhydride-modified EEA, maleic anhydride-modified EVA manufactured by Du Pont-Mitsui Polychemicals Co., Ltd.), BONDfast series (maleic anhydride-modified EMA manufactured by Sumitomo Chemical Co., Ltd.), Dumilan series (maleic anhydride-modified EVOH manufactured by Takeda Pharmaceutical Co., Ltd.), Bondine (an ethylene-acrylate-maleic anhydride ternary copolymer manufactured by ATOFINA), Tuftec (maleic anhydride-modified SEBS, M1943 manufactured by Asahi Kasei Corporation ), Kraton (maleic anhydride-modified SEBS, FG1901X manufactured by Kraton Polymer), Tufprene (maleic anhydride-modified SBS, 912 manufactured by Asahi Kasei Corporation), Septon (maleic anhydride-modified SEPS (manufactured by Kuraray Co., Ltd.), Lexpearl (maleic anhydride-modified EVA, ET-182G, 224M, 234M manufactured by Japan Polyolefin Corporation), Auroren (maleic anhydride-modified EVA, 200S, 250S manufactured by Nippon Paper Chemicals Co., LTD.), and other maleic anhydride-modified polyethylenes; and Admer (for example, QB550, LF128 manufactured by Mitsui Chemicals, Inc.) and other maleic anhydride-modified polypropylene.

The compound capable of introducing the nitrogen-containing heterocycle may be the nitrogen-containing heterocycle itself as mentioned above, or a nitrogen-containing heterocycle having the substituent (for example, hydroxy group, thiol group, and amino group) which can react with the maleic anhydride and other cyclic acid anhydride group.

The method used in producing the thermoplastic elastomer according to the second aspect of the present invention is not particularly limited, and any method commonly used in the art may be selected, for example, a method comprising the step of reacting the compound capable of forming covalent bond with the thermoplastic elastomer according to the first aspect of the present invention (hereinafter referred to as "reaction step B"); and the method comprising the reaction step of reacting the compound capable of forming covalent bond with the elastomeric polymer having a cyclic acid anhydride group in its side chain (hereinafter referred to as the "reaction step C") and the subsequent step of reacting with a compound capable of introducing the nitrogen-containing heterocycle can be introduced (hereinafter referred to as the "reaction step D").

The reaction step B is a step of mixing the thermoplastic elastomer according to the first aspect of the present invention with the compound capable of forming covalent bond, and reacting them at a temperature (for example, 80 to 200° C.) capable of promoting the covalent bonding of the covalently crosslinkable moiety of the thermoplastic elastomer and the compound. This reaction produces the crosslinkings represented by the formulae (7) to (9) in the resulting thermoplastic elastomer.

In the reaction step B, the compound capable of forming covalent bond is reacted with the covalently crosslinkable moiety of the thermoplastic elastomer according to the first aspect of the present invention so that an adequate number of covalent crosslinking (for example, 1 to 3 per molecule) is formed.

The reaction step C is a step of mixing the compound capable of forming covalent bond with the elastomeric polymer having a cyclic acid anhydride group in its side chain, and reacting them (causing ring opening of the cyclic acid anhydride group) at a temperature (for example, 80 to 200° C.) capable of promoting the covalent bonding of the compound and the cyclic acid anhydride group. This reaction produces the thermoplastic elastomer having a side chain containing the structure represented by the formulae (7) to (9).

In the reaction step C, the compound capable of forming covalent bond is reacted with the elastomeric polymer having a cyclic acid anhydride group in its side chain so that an adequate number of covalent crosslinking (for example, 1 to 3 per molecule) is formed.

The reaction step D is a step of mixing the elastomeric polymer after the reaction step C with the compound capable of introducing the nitrogen-containing heterocycle, and reacting them (causing ring opening of the cyclic acid anhydride group) at a temperature (for example, 80 to 200° C.) capable of promoting the covalent bonding of the cyclic acid anhydride group remaining in the elastomeric polymer and the compound. This reaction produces the thermoplastic elastomer having a side chain containing the structure represented by the formulae (2) or (3).

In the reaction step D, the compound capable of introducing the nitrogen-containing heterocycle is preferably reacted with a part or all of the cyclic acid anhydride group remaining in the elastomeric polymer after the reaction step C since the unreacted cyclic acid anhydride will then be the covalently crosslinkable moiety. In this case, "a part" preferably means at least 1% by mole, more preferably at least 50% by mole, and further more preferably at least 80% by mole in relation to 100% by mole of the cyclic acid anhydride group. Within such range, the nitrogen-containing heterocycle introduced will have its effect, and tensile strength after the crosslinking will be improved.

In the production methods as described above, the group (structure) in the side chains of the thermoplastic elastomer, namely, the unreacted cyclic acid anhydride group and the structure represented by the formulae (2), (3), and (7) to (9) may be confirmed by the analysis commonly used in the art such as NMR and IR spectrum.

Next, binding position of the nitrogen-containing heterocycle of the thermoplastic elastomer of the present invention is described. For convenience of description, the nitrogen-containing heterocycle used in the description is referred to as the "nitrogen-containing n-membered ring compound (n≧3)".

The binding positions in the following description ("position 1 to position n") are based on IUPAC nomenclature. For example, in the case of the compound having three nitrogen atoms having unshared electron pair, the binding position is determined by the order defined in the IUPAC nomenclature. More specifically, the binding positions are indicated on the nitrogen-containing heterocycles of the five-membered ring, the six-membered ring, and the condensed ring exemplified above.

In the thermoplastic elastomer of the present invention, the binding position of the nitrogen-containing n-membered ring compound which binds to the copolymer either directly or by the organic group is not particularly limited, and the binding position may be any position (position 1 to position n). The binding position, however, is preferably position 1 or positions 3 to n.

When one nitrogen atom is contained in the nitrogen-containing n-membered ring compound (for example, as in the case of pyridine ring), the binding position is preferably position 3 to position (n−1) for ease of intramolecular chelate formation and the superior physical properties of the composition including the tensile strength.

Adequate selection of the binding position of the nitrogen-containing n-membered ring compound facilitates, in the thermoplastic elastomer, smooth formation of the crosslinking by hydrogen bond, ionic bond, coordinate bond, and the like between the thermoplastic elastomers, and as a consequence, the composition will enjoy superior recyclability, mechanical properties, and in particular, excellent tensile strength.

Next, the composition containing the thermoplastic elastomer of the present invention (hereinafter simply referred to as "the composition of the present invention") is described.

The composition of the present invention contains at least one of the thermoplastic elastomer according to the first aspect of the present invention. When two or more thermoplastic elastomers are incorporated, the mixing ratio of the elastomeric polymers may be adequately selected depending on the application of the composition, physical properties required for the composition, and the like.

The composition of the present invention may preferably contain carbon black and/or silica as a reinforcing agent. An adequate type of the carbon black may be selected depending on the application of the composition. Carbon black is generally divided into hard carbon and soft carbon based on the particle size. Soft carbon has a relatively weak reinforcement action on rubbers whereas hard carbon has a stronger reinforcement action on the rubbers. In the present invention, use of a hard carbon having strong reinforcement action is preferred.

Such carbon black is preferably incorporated (when the carbon black is incorporated alone) at a content of 0.1 to 200 parts by mass, more preferably at a content of 1 to 100 parts by mass, and further more preferably at a content of 1 to 80 parts by mass in relation to 100 parts by mass of the thermoplastic elastomer of the present invention.

The silica incorporated is not particularly limited, and exemplary silicas include fumed silica, calcined silica, precipitated silica, pulverized silica, molten silica, and diatomaceous earth. Such silica is preferably incorporated (when the silica is incorporated alone) at a content of 0.1 to 200 parts by mass, more preferably at a content of 1 to 100 parts by mass, and further more preferably at a content of 1 to 80 parts by mass in relation to 100 parts by mass of the thermoplastic elastomer of the present invention. Among these, precipitated silica is preferred.

When silica is used for the reinforcing agent it may be used in combination with a silane coupling agent. Exemplary silane coupling agents include bis(triethoxysilylpropyl) tetrasulfide (Si69), bis(triethoxysilylpropyl) disulfide (Si75), γ-mercaptopropyl trimethoxysilane, and vinyl trimethoxysilane, and an aminosilane compound as described below may also be employed.

When the carbon black and the silica are incorporated in combination, they may be incorporated at a content (at a total content of the carbon black and the silica) of 0.1 to 200 parts by mass, more preferably at a content of 1 to 100 parts by mass, and further more preferably at a content of 1 to 80 parts by mass in relation to 100 parts by mass of the thermoplastic elastomer of the present invention.

If necessary, the composition of the present invention may contain a polymer other than the thermoplastic elastomer of the present invention, a reinforcing agent (filler) other than the carbon black and the silica, a filler having an amino group introduced therein (hereinafter simply referred to as "amino group-introduced filler"), an amino group-containing compound other the amino group-introduced filler, a compound containing a metal element (hereinafter simply referred to as "metal salt"), maleic anhydride-modified polymer, an antiaging agent, an antioxidant, a pigment, a dye, a plasticizer, a thixotropic agent, a UV absorbent, a flame retardant, a solvent, a surfactant (including leveling agent), an dispersant, a dehydrator, an anticorrosive, an adhesion promoter, an antistatic, a filler, and other additives to the degree that the object of the present invention is not impaired.

The additives may be those commonly used in the art, and some of the additives are as described below. The additives, however, are not limited to those described below.

The polymer other than the thermoplastic elastomer of the present invention is preferably a polymer having a glass transition temperature of up to 25° C. for the same reason as described above. Exemplary such polymers include natural rubber (NR), isoprene rubber (IR), butadiene rubber (BR), 1,2-butadiene rubber, styrene-butadiene rubber (SBR), acrylonitrile-butadiene rubber (NBR), butyl rubber (IIR), ethylene-propylene-diene rubber (EPDM), ethylene-propylene rubber (EPM), ethylene-acrylic rubber (AEM), and ethylene-butene rubber (EBM), and the preferred are the polymers having no unsaturated bond such as IIR, EPM, and EBM or the polymer having less unsaturated bond such as EPDM. Also preferred are polymers having the moiety capable of undergoing hydrogen bond, and examples of such polymers include polyester, polylactone, and polyamide.

The composition of the present invention may contain either one polymer or two or more polymers other than the thermoplastic elastomer of the present invention, and such polymer is preferably incorporated at a content of 0.1 to 100 parts by mass, and more preferably at 1 to 50 parts by mass in relation to 100 parts by mass of the thermoplastic elastomer of the present invention.

Exemplary reinforcements other than the carbon black and the silica include iron oxide, zinc oxide, aluminum oxide, titanium oxide, barium oxide, magnesium oxide, calcium carbonate, magnesium carbonate, zinc carbonate, pyrophyllite clay, kaolin clay, and calcined clay. Such reinforcing agent is preferably incorporated at a content of 0.1 to 100 parts by mass, and more preferably at a content of 1 to 80 parts by mass in relation to 100 parts by mass of the thermoplastic elastomer of the present invention.

The filler which serves the base of the amino group-introduced filler (hereinafter sometimes simply referred to as "base filler") may be, for example, those mentioned as the reinforcements which may be optionally added to the composition. In view of ease of introducing the amino group and ease of adjusting the proportion of the amino group introduced (introduction rate), the preferred are silica, carbon black, and calcium carbonate, and the more preferred is silica.

The amino group introduced in the base filler (hereinafter sometimes simply referred to as "amino group") is not particularly limited, and exemplary amino groups include aliphatic amino groups, aromatic amino groups, heterocyclic amino groups, and mixtures of a plurality of such amino groups.

In the present invention, the amino group included in an aliphatic amine compound is referred to as the "aliphatic amino group", the amino group bonded to the aromatic group of an aromatic amine compound is referred to as the "aromatic amino group", and the amino group included in a heterocyclic amine compound is referred to as the "heterocyclic amino group".

Among these, the amino group is preferably a heterocyclic amino group, a mixed amino group containing a heterocyclic amino group, or an aliphatic amino group, and more preferably a heterocyclic amino group or an aliphatic amino group in view of the capability of undergoing an adequate interaction with the thermoplastic elastomer of the present invention and capability of effective dispersion in the thermoplastic elastomer.

The classification of the amino group in the amino group-containing compound is not particularly limited, and the amino group may be either primary (—NH$_2$), secondary (imino group, >NH), tertiary (>N—), or quarternary (>N$^+$<).

When the amino group is a primary amino group, the interaction with the thermoplastic elastomer of the present invention tends to be stronger, and gelation may take place depending on the conditions used in preparing the composition. On the other hand, when the amino group is a tertiary amino acid, the interaction with the thermoplastic elastomer of the present invention tends to be weaker, and the effects of improving the compression set and the like of the resulting composition may be insufficient.

In view of such situation, the amino group is preferably either primary or secondary amino group, and more preferably secondary amino group.

In other words, the amino group is preferably a heterocyclic amino group, a mixed amino group containing a heterocyclic amino group, or a primary or secondary aliphatic amino group, and more preferably a heterocyclic amino group or a primary or secondary aliphatic amino group.

The base filler may have one amino group on its surface. However, the base filler may preferably have two or more amino groups on its surface in view of the superior effect of improving the compression set and other properties.

When the base filler has two or more amino groups, it is preferable that at least one of the two or more amino groups is a heterocyclic amino group, and the base filler also has a primary or secondary amino group (aliphatic amino group, aromatic amino group, or heterocyclic amino group).

The type and the classification of the amino group may be adequately selected depending on the physical properties required for the composition.

The amino group-introduced filler is produced by introducing the amino group in the base filler.

The method used for introducing the amino group is not particularly limited, and the surface treating methods (for example, the surface modifying method and the surface covering method) generally used in producing various fillers and reinforcements is exemplified. Exemplary preferable methods include the method wherein a compound having a functional group capable of reacting with the base filler and the amino group is reacted with the base filler (surface modifying method); the method wherein the surface of the base filler is coated with a polymer having the amino group (surface covering method); and the method wherein a compound having the amino group is reacted with the filler in the step of the filler synthesis.

Such amino group-introduced filler may be used either alone or in combination of two or more. When two or more amino group-introduced fillers are used in combination, their mixing ratio may be adequately selected depending on the application, the physical properties required, and the like of the composition of the present invention.

Such amino group-introduced filler is preferably used at a content of 0.1 to 200 parts by mass, more preferably at 10 parts by mass or more, and further more preferably at 30 parts by mass or more per 100 parts by mass of the thermoplastic elastomer of the present invention.

Next, the amino group-containing compound other the amino group-introduced filler is described.

The amino group in the amino group-containing compound may be basically the same as the one described for the amino group-introduced filler, and the number of amino groups is not particularly limited as long as the amino group-containing compound has at least one amino group. The amino group-containing compound, however, may preferably have two or more amino groups since the compound will then be capable of forming two or more crosslinking bonds with the thermoplastic elastomer of the present invention to more effectively improve the physical properties.

The classification of the amino group in the amino group-containing compound is not particularly limited, and as in the case of the amino group-introduced filler, the amino group may be either primary (—NH$_2$), secondary (imino group, >NH), tertiary (>N—), or quarternary (>N$^+$<) depending on the recyclability, compression set, hardness, and mechanical strength, in particular, tensile strength required for the composition of the present invent Ion. When a secondary amino group is selected, the amino group-containing compound is likely to have a superior mechanical strength, whereas the amino group-containing compound is likely to have a superior recyclability when a tertiary amino group is selected. Use of an amino group-containing compound having two secondary amino groups is particularly favorable since the resulting composition of the present invention will enjoy excellent and well-balanced recyclability, compression set, and mechanical strength.

When the amino group-containing compound has two or more amino groups, the number of primary amino groups in the compound is preferably up to two, and more preferably up to one. When the compound has three or more primary amino groups, the (crosslinking) bond formed by these amino groups and the functional group of the thermoplastic elastomer of the present invention may become excessively firm to detract from the excellent recyclability.

In other words, the classification and the number of the amino group, and the structure of the amino group-containing compound may be adequately adjusted and selected depending on the bond strength of the functional group of the thermoplastic elastomer of the present invention and the amino groups in the amino group-containing compound and the like.

Exemplary preferable amino group-containing compounds include N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, N,N',N"-trimethyl bis(hexamethylene)triamine, and other secondary aliphatic diamines; tetramethyl-1,6-hexanediamine and other tertiary aliphatic diamines; aminotriazole, aminopyridine, and other polyamines containing an aromatic primary amine and a heterocyclic amine; dodecylamine and other straight chain alkylmonoamines; dipyridyl and other tertiary heterocyclic diamines since they are highly effective in improving compression set, mechanical strength, in particular, tensile strength and the like.

Among these, the preferred are secondary aliphatic diamines, polyamines containing aromatic primary amine and hyterocyclic amine, and tertiary heterocyclic diamines.

In addition to those mentioned above, the amino group-containing compound may also be a macromolecular compound having an amino group.

The macromolecular compound having the amino group is not particularly limited, and exemplary such compounds include polyamide, polyurethane, urea resin, melamine resin, polyvinylamine, polyallylamine, polyacrylamide, polymethacrylamide, polyaminostyrene, amino group-containing polysiloxane and other polymers, and polymers prepared by modifying various polymers with a compound having an amino group.

These polymers are not particularly limited for their average molecular weight, molecular weight distribution, viscosity, and other physical properties, and the physical properties may be adequately selected depending on the application and the physical properties required for the composition of the present invention.

The macromolecular compound having the amino group is preferably a polymer produced by polymerizing (by polyaddition or polycondensation) a condensable or polymerizable compound (monomer) having the amino group. More preferably, the macromolecular compound having the amino group is a polysiloxane which is a homo-condensation product of a silyl compound having a hydrolyzable substituent and the amino group, or a co-condensation product of such silyl compound with a silyl compound having no amino group, in view of availability, ease of production, ease of adjusting the molecular weight, ease of adjusting the introduction rate of the amino group, and the like.

The silyl compound having the hydrolyzable substituent and the amino group is not particularly limited, and exemplary compounds are aminosilane compounds including γ-aminopropyltrimethoxysilane, γ-aminopropyltriethoxysilane, γ-aminopropylmethyldimethoxysilane, γ-aminopropylmethyldiethoxysilane, 4-amino-3,3-dimethylbutyltrimethoxysilane (these compounds can be obtained from Nippon Unicar Company Limited), and other aminosilane compounds having an aliphatic primary amino group; N,N-bis[(3-trimethoxysilyl)propyl]amine, N,N-bis[(3-triethoxysilyl)propyl)]amine, N,N-bis[(3-tripropoxysilyl)propyl]amine (these compounds can be obtained from Nippon Unicar Company Limited), 3-(n-butylamino)propyltrimethoxysilane (for example, Dynasilane 1189 manufactured by Degussa-Huls), N-ethyl-aminoisobutyltrimethoxysilane (for example, Silquest A-Link 15 silane manufactured by OSi Specialities, Inc.), and other aminosilane compounds having an aliphatic secondary amino group; N-β(aminoethyl)γ-aminopropylmethyldimethoxysilane, N-β(aminoethyl)γ-aminopropyltrimethoxysilane, N-β(aminoethyl)γ-aminopropyltriethoxysilane (these compounds can be obtained from Nippon Unicar Company Limited), and other aminosilane compounds having an aliphatic primary and an aliphatic secondary amino groups; N-phenyl-γ-aminopropyltrimethoxysilane (this compound can be obtained from Nippon Unicar Company Limited), and other aminosilane compounds having an aromatic secondary amino group; and imidazole trimethoxysilane (this compound can be obtained from Japan Energy Corporation), triazole silane produced by reacting aminotriazole with an epoxysilane compound, an isocyanatesilane compound, or the like in the presence or absence of the catalyst at a temperature equal to room temperature or higher temperature, and aminosilane compounds having a heterocyclic amino group.

Among these, the preferred are the aminosilane compound having an aliphatic primary amino group, the aminosilane compound having an aliphatic secondary amino group, and the aminosilane compound having an aliphatic primary and an aliphatic secondary amino groups in view of their high effectivity in improving the compression set and other physical properties.

The silyl compound having no amino group is not particularly limited as long as it is a compound which is different from the silyl compound having a hydrolyzable substituent and the amino group, and which does not contain the amino group, and exemplary such compounds include alkoxysilane compounds and halogenated silane compounds. Among these, the preferred are alkoxysilane compounds in view of their availability, ease of handling, and excellent physical properties of the co-condensation product.

Exemplary alkoxysilane compounds include tetramethoxysilane, tetraethoxysilane, tetrabuthoxysilane, tetraisopropoxysilane, methyltrimethoxysilane, methyltriethoxysilane, methyltributhoxysilane, methyltriisopropoxysilane, phenyltrimethoxysilane, and dimethyldimethoxysilane.

Exemplary halogenated silane compound include tetrachlorosilane and vinyl trifluorosilane.

Among these, the preferred are tetraethoxysilane and tetramethoxysilane in view of their low price and safety in handling.

The silyl compound having a hydrolyzable substituent and the amino group and the silyl compound having no amino group may be used either alone or in combination of two or more.

Such macromolecular compound having the amino group may be used either alone or in combination of two or more. When two or more such macromolecular compounds having the amino group are used in combination, their mixing ratio may be adequately selected depending on the application, the physical properties required, and the like of the composition of the present invention.

The content of the macromolecular compound having an amino group can be defined by the number (equivalent) of the nitrogen atom in the compound in relation to the side chain of the thermoplastic elastomer of the present invention as in the case of the amino group-containing compound as described above. However, there may exist some amino groups incapable of effectively undergoing interaction with the thermoplastic elastomer depending on the structure, molecular weight, and the like of the macromolecular compound.

Accordingly, the macromolecular compounds having the amino group is preferably used at a content of 1 to 200 parts by mass, more preferably at 5 parts by mass or more, and further more preferably at 10 parts by mass or more per 100 parts by mass of the thermoplastic elastomer of the present invention.

The metal salt is not particularly limited as long as it is a compound containing at least one metal element, and the metal salt is preferably a compound containing at least one metal element selected from the group consisting of Li Na, K, Ti, V, Cr, Mn, Fe, Co, Ni, Cu, Zn, Ga, and Al.

Exemplary metal salts include a salt of a saturated aliphatic acid such as formate, acetate, or stearate; a salt of an unsaturated aliphatic acid such as (meth)acrylate; a metal alkoxide (a reaction product with an alcohol containing 1 to 12 carbon atoms); nitrate, carbonate, hydrogencarbonate, chloride, oxide, hydroxide, and a complex with a diketone containing 1 to 20 carbon atoms containing at least one metal element.

The "complex with a diketone" used herein designates a complex formed by cordination of a metal atom with, for example, a 1,3-diketone (for example, acetyl-acetone).

Among these, the metal element is preferably Ti, Al, or Zn, and the metal salt is preferably a salt of a saturated aliphatic acid containing 1 to 20 carbon atoms such as acetate or stearate, metal alkoxide (a reaction product with an alcohol containing 1 to 12 carbon atoms), oxide, hydroxide, and a complex with a diketone of such metal, and more preferably a salt of a saturated aliphatic acid containing 1 to 20 carbon atoms such as stearate, a metal alkoxide (a reaction product with an alcohol containing 1 to 12 carbon atoms), and a complex with a diketone of such metal.

The metal salt may be used either alone or in combination of two or more. When two or more metal salts are used in combination, their mixing ratio may be adequately selected depending on the application, the physical properties required, and the like of the composition of the present invention.

Such metal salt is preferably used at a content of 0.05 to 3.0 equivalents, more preferably at 0.1 to 2.0 equivalents, and further more preferably at 0.2 to 1.0 equivalents in relation to the carbonyl group in the thermoplastic elastomer of the present invention. When the content of the metal salt is within such range, the resulting composition of the present invention will enjoy improved physical properties such as compression set, hardness, and mechanical strength, in particular, tensile strength.

The metal salt may be any one of the possible hydroxides, metal alkoxides, carboxylates, and the like of the metal. For example, in the case of hydroxide, the metal salt in the case when the metal is iron may be either $Fe(OH)_2$ or $Fe(OH)_3$, and these metal salts may be used either alone or as a mixture.

As described above, the metal salt is preferably a compound containing at least one metal element selected from the group consisting of Li, Na, K, Ti, V, Cr, Mn, Fe, Co, Ni, Cu, Zn, Ga, and Al. However, the compound may also contain a metal element other than such metal elements to the degree such that the object of the present invention is not impaired. Although the content of the metal element other than such metal element is not particularly limited, such metal element is preferably incorporated at 1 to 50% by mole in relation to all metal elements in the metal salt.

The maleic anhydride-modified polymer is a polymer produced by modifying the elastomeric polymer as described above with maleic anhydride. Although the side chain of the maleic anhydride-modified polymer may contain a functional group other than the maleic anhydride residue and the nitrogen-containing heterocycle, the side chain preferably contains only the maleic anhydride residue.

The maleic anhydride residue is introduced (for modification) in the side chain or at the terminal of the elastomeric polymer, and not to the main chain of the elastomeric polymer. In addition, the maleic anhydride residue is a cyclic acid anhydride group, and this cyclic acid anhydride group (moiety) will not undergo ring opening.

Accordingly, exemplary maleic anhydride-modified thermoplastic polymer is the thermoplastic elastomer having cyclic acid anhydride group but not nitrogen-containing heterocycle in the side chain as shown in the following formula (26) produced by the reaction of ethylenic unsaturated bond of the maleic anhydride with the elastomeric polymer, and examples are those mentioned above for the elastomeric polymer having a cyclic acid anhydride group in its side chain.

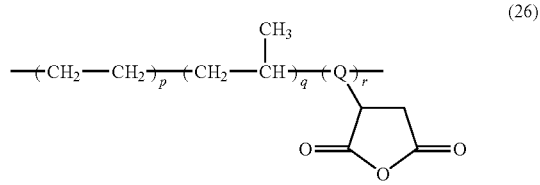

(26)

In the formula, Q represents ethylene residue or propylene residue, and p, q, and r independently represent a number of 0.1 to 99.

The degree of the maleic anhydride modification is preferably 0.1 to 50% by mole, more preferably 0.3 to 30% by mole, and further more preferably 0.5 to 10% by mole per 100% by mole of the back bone moiety of the elastomeric polymer in view of the ability of improving the compression set without adversely affecting the recyclability.

The maleic anhydride-modified polymer may be used either alone or in combination of two or more. When two or more maleic anhydride-modified polymers are used in combination, their mixing ratio may be adequately selected depending on the application, the physical properties required, and the like of the composition of the present invention.

Such maleic anhydride-modified polymer is preferably used at a content of 1 to 100 parts by mass, and more preferably at 5 to 50 parts by mass per 100 parts by mass of the thermoplastic elastomer of the present invention. When the content of the maleic anhydride-modified polymer is within such range, the resulting composition of the present invention will enjoy excellent workability and mechanical strength.

When the elastomeric polymer having the cyclic acid anhydride group on its side chain remains unreacted in the production of the thermoplastic elastomer of the present invention, and more specifically, in the reaction step A or B, the remaining elastomer modified with the carbonyl-containing group may be left unremoved from the composition of the present invention.

Exemplary antiaging agents include hindered phenol compounds and aliphatic and aromatic hindered amine compounds.

Exemplary antioxidants include butyl hydroxy toluene (BHT), and butyl hydroxy anisole (BHA).

Exemplary pigments include titanium dioxide, zinc oxide, ultramarine, iron red, lithopone, lead, cadmium, iron, cobalt, aluminum, hydrochloride, sulfate, and other inorganic pigments; and azo pigment, copper phthalocyanine pigment, and other organic pigments.

Exemplary plasticizers include benzoic acid, phthalic acid, trimellitic acid, pyromellitic acid, adipic acid, sebasic acid, fumaric acid, maleic acid, itaconic acid, citric acid, derivatives thereof, and polyester, polyether, and epoxy plasticizers.

Exemplary thixotropic agents include benton, silicic anhydride, silicic acid derivatives, and urea derivatives.

Exemplary UV absorbents include 2-hydroxybenzophenone, benzotriazole, and salicylic acid ester UV absorbents.

Exemplary flame retardants include TCP and other phosphorus flame retardants; paraffin chroride, perchloropentacyclodecane, and other halogenic flame retardants; antimony oxide and other antimony flame retardants; and aluminum hydroxide.

Exemplary solvents include hexane, toluene, and other hydrocarbons; tetrachloromethane chloride and other halogenated hydrocarbons; acetone, methyl ethyl ketone, and other ketones; diethyletehr, tetrahydrofuran, and other ethers; and ethyl acetate and other esters.

Exemplary surfactants (leveling agent) include polybutyl acrylate, polydimethylsiloxane, modified silicone compound, and fluorosurfactants.

Exemplary dehydrators include vinylsilane.

Exemplary anticorroasives include zinc phosphate, tannic acid derivative, phosphoric acid ester, basic sulfonate, and other rust preventive pigments.

Exemplary adhesion promoters include known silane coupling agents, silane compounds containing an alkoxysilyl group, titanium coupling agents, and zirconium coupling agents, and more specifically, trimethoxy vinylsilane, vinyltriethoxysilane, vinyl tris(2-methoxyethoxy)silane, γ-methacryloxy propyl trimethoxysilane, and 3-glycidoxy propyl trimethoxysilane.

Exemplary antistatic agents generally include quaternary ammonium salts, and polyglycols, ethylene oxide derivatives, and other hydrophilic compounds.

The plasticizer is preferably incorporated at a content of 0.1 to 50 parts by mass, and more preferably at 1 to 30 parts by mass per 100 parts by mass of the thermoplastic elastomer of the present invention. Other additives are preferably incorporated at a content of 0.1 to 10 parts by mass, and more preferably at 1 to 5 parts by mass per 100 parts by mass of the thermoplastic elastomer of the present invention.

Some of the thermoplastic elastomers of the present invention are self-crosslinkable. However, a vulcanizing agent, a accelerator activator, a vulcanization accelerator, a vulcanization retarder, and the like may be used in combination as long as the merit of the present invention is not impaired.

Exemplary vulcanizing agents include sulfur vulcanizing agents, organic peroxide vulcanizing agents, metal oxide vulcanizing agents, phenol resin vulcanizing agents, and quinone dioxime vulcanizing agents.

Exemplary sulfur vulcanizing agents include powdered sulfur, precipitated sulfur, highly dispersible sulfur, surface treated sulfur, insoluble sulfur, dimorpholine disulfide, and alkyl phenol disulfides.

Exemplary organic peroxide vulcanizing agents include benzoyl peroxide, t-butylhydroperoxide, 2,4-dichlorobenzoylperoxide, 2,5-dimethyl-2,5-di(t-butylperoxy)hexane, and 2,5-dimethylhexane-2,5-di(peroxyl benzoate).

Other vulcanizing agents include magnesium oxide, litharge (lead oxide), p-quinone dioxime, tetrachloro-p-benzoquinone, p-dibenzoylquinone dioxime, poly-p-dinitrosobenzene, and methylenedianiline.

Exemplary accelerator activators include zinc oxide, magnesium oxide, amines; acetyl acid, propionic acid, butanoic acid, stearic acid, acrylic acid, maleic acid, and other aliphatic acids; zinc acetylate, zinc propionate, zinc butanoate, zinc stearate, zinc acrylate, zinc maleate, and other zinc salts of aliphatic acids.

Exemplary vulcanization accelerators include tetramethylthiuram disulfide (TMTD), tetraethylthiuram disulfide (TETD), and other thiuram vulcanization accelerators; hexamethylenetetramine and other aldehyde ammonia vulcanization accelerators; diphenylguanidine and other guanidine vulcanization accelerators; 2-mercaptobenzothiazol, dibenzothiazyl disulfide (DM), and other thiazole vulcanization accelerators; and N-cyclohexyl-2-benzothiazylsulfenamide, N-t-butyl-2-benzothiazylsulfenamide, and other sulfenamide vulcanization accelerators. An alkylphenol resin or its halide may also be employed.

Exemplary vulcanization retarders include phthalic anhydride, benzoic acid, salicylic acid, acetylsalicylic acid, and other organic acids; N-nitroso-diphenylamine, N-nitrosophenyl-β-naphthylamine, polymer of N-nitroso-trimethyl-dihydroquinoline, and other nitroso compounds; trichloromelamine and other halides; 2-mercaptbenzimidazole; and N-(cyclohexylthio)phthalimide (for example, Santogard PVI manufactured by Flexsys).

Such vulcanizing agent and the like are preferably incorporated at a content of 0.1 to 20 parts by mass, and more preferably at 1 to 10 parts by mass in relation to 100 parts by mass of the thermoplastic elastomer of the present invention.

The production methods of the composition of the present invention is not particularly limited, and the composition may be produced, for example, by mixing the thermoplastic elastomer of the present invention with the optional additives or the like by a roll, kneader, extruder, universal stirrer or the like.

The vulcanization conditions used when the composition of the present invention is permanently crosslinked (by using a vulcanizing agent) are not particularly limited, and an adequate set of conditions may be selected depending on the components incorporated in the composition, and the like. An exemplary vulcanization condition is the vulcanization carried out at a temperature of 130 to 200° C. for 5 to 60 minutes.

When the thermoplastic elastomer (composition) of the present invention is heated to a temperature of about 80 to 200° C., the three dimensional crosslinking (crosslinking structure) will become dissociated and the thermoplastic elastomer will gain some softness and fluidity presumably because of weakening of the intermolecular and intramolecular interactions between the side chains.

When the thermoplastic elastomer (composition) of the present invention that has become softer and more fluid is left at a temperature of 80° C. or lower, the once dissociated three dimensional crosslinking (crosslinking structure) will regain its crosslinking to cure. The recyclability of the thermoplastic elastomer (composition) of the present invention is realized by repetition of such steps.

The thermoplastic elastomer (composition) of the present invention can be used in a variety of applications where rubbers have been used by taking advantage of, for example, their rubber elasticity. Use as a hot melt adhesive or as an additive incorporated in such a hot melt adhesive is also preferable since the thermoplastic elastomer is capable of improving the heat resistance and recyclability. The thermoplastic elastomer (composition) of the present invention is well adapted for use in automobile applications, hoses, belts, sheets, vibration isolating rubbers, rollers, linings, rubber-lined fabrics, sealants, gloves, fenders, medical rubbers (for example, syringe gaskets, tubes, and catheters), gaskets (home appliance and construction materials), asphalt modifiers, hot melt adhesives, boots, grip members, toys, shoes, sandals, key pads, gears, cap linings of PET bottles, and the like.

The automobile applications include use of the thermoplastic elastomer for tread, carcass, side wall, inner liner, undertread, belt, and other parts of tire; radiator grille, side molding, garnish (pillar, rear, and top of cowl), aero parts (air dam and spoiler), wheel cover, weather strip, cowbelt grille, air outlet louver, air scoop, hood bulge, parts of ventilation opening, barrier parts (overfender, side seal panel, molding (window, hood, and door belt), and marks in the exterior; weather strip of doors, lights, and wipers, glass run, glass run channel, and other parts of interior window frame; air duct hose, radiator hose, and brake hose; crank shaft seal, valve stem seal, head cover gasket, A/T oil cooler hose, mission oil seal, P/S hose, P/S oil seal, and other parts of lubrication oil system; fuel hose, emission control hose, inlet filler hose, diaphragm, and other parts of fuel system; engine mount, intank pump mount, and other vibration isolating parts; CVJ boots, rack and pinion boots, and other boots; A/C hose, A/C seal, and other parts of air conditioner; timing belt, auxiliary belt, and other belt members; and windshield sealer, vinyl plastisol sealer, anaerobic sealer, body sealer, spot weld sealer, and other sealers.

The thermoplastic elastomer (composition) of the present invention may also be incorporated as a rubber modifier, for example, an anti-flow agent in a resin or rubber which would undergoes cold flow at room temperature to thereby prevent flow upon extrusion and cold flow.

The thermoplastic elastomer (composition) of the present invention exhibits superior mechanical strength while retaining equivalent recyclability compared to the conventional thermoplastic elastomer, and therefore, among the applications as mentioned above, it is particularly adapted for use in the application wherein the recyclability and the mechanical strength are simultaneously required.

EXAMPLES

Next, the present invention is described in further detail by referring to the Examples which by no means limit the scope of the present invention.

Examples 1 to 7 and Comparative Example 1

To 100 g of maleic anhydride-modified ethylene-propylene copolymer (manufactured by DSM Japan; prototype; ethylene content, 60% by mole; degree of maleic anhydride modification, 0.8% by mole; weight average molecular weight, 90,000) (maleic anhydride skeleton, 22.4 mmol) was added 4H-3-amino-1,2,4-triazole (ATA) at the equivalent ratio (equivalent ratio to the skeleton of the maleic anhydride) shown in Table 1, below, and the mixture was heated and kneaded at 170° C. for 30 to 35 minutes in a kneader. N,N'-dimethyl-1,6-hexanediamine or hexanediol was added at an equivalent ratio shown in Table 1, below, and the mixture was heated and kneaded at 170° C. for 30 to 35 minutes in a kneader to prepare the thermoplastic elastomer.

Comparative Example 2

The procedure of Comparative Example 1 was repeated by replacing 4H-3-amino-1,2,4-triazole with N,N'-dimethyl-1,6-hexanediamine to prepare the thermoplastic elastomer.

The thermoplastic elastomers obtained in the reaction were confirmed for their structure by NMR and IR.

The thermoplastic elastomers obtained in Examples 1 to 7 and Comparative Examples 1 and 2 were evaluated for their recyclability and their crosslinking density by the measurement procedures as described below. The results are shown in Table 1, below.

[Recyclability]

The thermoplastic elastomers obtained were pressed at an elevated temperature of 200° C. for 10 minutes to produce a sheet with a thickness of 2 mm. The sheet was then cut in pieces and pressed again. The elastomers were evaluated for their recyclability by the number of pressing operations that could produce an integral seamless sheet.

The elastomers that allowed production of the sheet for 10 or more times were evaluated "A", those allowed the sheet production 5 time or more and less than 10 times were evaluated "B", and the one that allowed the sheet production less than 5 times was evaluated "C".

[Measurement of Crosslinking Density]

3 g of each elastomer was placed in 150 g of toluene, and the elastomer was fully immersed in the toluene for 72 hours. Crosslinking density ν was calculated by the Flory-Rehner equation, below. The immersion was conducted under the conditions defined in JIS K6258-1993 except those described above.

The elastomer of Comparative Example 1 was soluble in toluene, and therefore, the crosslinking density of this elastomer is indicated as "-" in Table 1, below.

$$\nu = \{\ln(1-v) + v + \chi v^2\}/2V(v^{1/3} - v/2)$$

In the equation, v is volume fraction of the rubber after the swelling, V is molecular volume (m³/mol) of the solvent, χ is parameter of the interaction between the solvent and the rubber.

As demonstrated in Table 1, the thermoplastic elastomers obtained in Examples 1 to 7 have excellent crosslinking density while retaining the excellent recyclability of the level comparative or superior to the thermoplastic elastomer not having the side chain containing the covalently crosslinkable moiety (Comparative Example 1) or the thermoplastic elastomer not having the side chain having a moiety crosslinkable by hydrogen bond containing a carbonyl-containing group and a nitrogen-containing heterocycle (Comparative Example 2). They also exhibited improved tensile strength.

In the cases of the thermoplastic elastomers obtained in Examples 4 and 7 wherein a excessive amount of the diamine or the diol was added to the maleic anhydride skeleton (cyclic acid anhydride group), the excessively added diamine or the diol were found to further improve the crosslinking density.

Examples 8 to 14

To a kneader set at a temperature of 200° C. was added 100 g of maleic anhydride-modified ethylene-propylene copolymer (prototype manufactured by Mitsui Chemicals, Inc., hereinafter referred to as "maleinized EPM"), and after preliminarily kneading for 3 minutes, 4H-3-amino-1,2,4-triazole (ATA) was added at the amount (parts by mass) shown in Table 2 and the mixture was kneaded for another 7 minutes. To this mixture was added one of polyethylene glycol laurylamines 1 and 2, polyethylene glycols 1 and 2, and polypropylene glycols 1 to 3 at the amount (parts by mass) shown in Table 2, and the mixture was kneaded for 5 minutes to prepare the thermoplastic elastomers.

The thermoplastic elastomers obtained as the result of the reaction were confirmed for their structure by NMR and IR.

The thermoplastic elastomers obtained in Examples 8 to 14 were evaluated for their recyclability by the measurement procedure as described above, and for JIS-A hardness, tensile properties, compression set (C-Set), and sheet surface tackiness by the measurement procedures as described below. The results are shown in Table 2.

[JIS-A Hardness]

The thermoplastic elastomers obtained were pressed at an elevated temperature of 200° C. for 10 minutes and sheet samples with the size of 2 cm (thickness)×15 cm (length)×15 cm (width) were produced to measure JIS-A hardness by the procedure according to JIS K6253.

[Tensile Properties]

The thermoplastic elastomers obtained were pressed at an elevated temperature of 200° C. for 10 minutes to produce a sheet with a thickness of 2 mm.

TABLE 1

|  | Comparative Example 1 | Comparative Example 2 | Example 1 | Example 2 | Example 3 | Example 4 | Example 5 | Example 6 | Example 7 |
|---|---|---|---|---|---|---|---|---|---|
| Amount of of ATA added | 1.0 | 0 | 0.7 | 0.8 | 0.9 | 0.9 | 0.7 | 0.9 | 0.9 |
| Amount of diamine added | 0 | 1.0 | 0.3 | 0.2 | 0.1 | 0.5 | 0 | 0 | 0 |
| Amount of diol added | 0 | 0 | 0 | 0 | 0 | 0 | 0.3 | 1.0 | 0.4 |
| Recyclability | A | C | A | A | A | A | B | A | A |
| Crosslinking density (×10⁻⁶ mol/cm³) | — | 33.0 | 8.4 | 6.5 | 3.2 | 17.3 | 8.6 | 4.5 | 17.5 |

No. 3 dumbbell test pieces were punched out from this sheet, and tensile test was conducted according to JIS K6251 at a tensile speed of 500 mm/min to thereby measure 100% modulus ($M_{100}$) [MPa], 300% modulus ($M_{300}$) [MPa], tensile strength at break ($T_B$) [MPa], and elongation at break ($E_B$) [%] at room temperature.

[Compression Set (C-Set)]

The thermoplastic elastomers obtained were pressed at an elevated temperature of 200° C. for 10 minutes to produce a sheet with a thickness of 2 mm. 7 sheets were stack and pressed at an elevated temperature of 200° C. for 20 minutes to produce a cylindrical sample with the size of 29 mm (diameter)×12.5 mm (thickness).

The cylindrical sample was compressed by 25% with a purpose-built jig, and kept at this state at 70° C. for 22 hours. The compression set was then measured according to JIS K6262.

[Sheet Surface Tackiness]

The thermoplastic elastomers obtained were pressed at an elevated temperature of 200° C. for 10 minutes to produce a sheet with a thickness of 2 mm, and this sheet was allowed to stand at room temperature for 24 hours. The sheet surface was then evaluated for its tackiness by touching with finger.

The results shown in Table 2 demonstrate that the thermoplastic elastomers obtained in Examples 8 and 9 having tertiary amino group (—N═) included in the covalent crosslinking exhibit superior compression set as well as equivalent or superior tensile strength at break and elongation at break compared to those obtained in Examples 10 to 14.

Examples 15 to 18

To a kneader set at a temperature of 200° C. was added 110 g of maleinized EPM, and after preliminarily kneading for 3 minutes, 4H-3-amino-1,2,4-triazole (ATA) was added at the amount (parts by mass) shown in Table 3 and the mixture was kneaded for another 7 minutes. To this mixture were added 2-isopropyl-4-methyl-5-hydroxymethylimidazol (IMH manufactured by Nippon Synthetic Chemical Industry Co., Ltd.) and polyethylene glycol glyceryl ether (UNIOX G450 manufactured by NOF Corporation) represented by the following formula (27) at the amounts (parts by mass) shown in Table 3, and the mixture was kneaded for 5 minutes to prepare the thermoplastic elastomers.

TABLE 2

|  | Example 8 | Example 9 | Example 10 | Example 11 | Example 12 | Example 13 | Example 14 |
|---|---|---|---|---|---|---|---|
| Maleinized EPM | 100 | 100 | 100 | 100 | 100 | 100 | 100 |
| ATA | 1.07 | 1.07 | 1.07 | 1.07 | 1.07 | 1.07 | 1.07 |
| Polyethylene glycol laurylamine 1 | 0.44 | | | | | | |
| Polyethylene glycol laurylamine 2 | | 0.79 | | | | | |
| Polyethylene glycol 1 | | | 1.57 | | | | |
| Polyethylene glycol 2 | | | | 3.18 | | | |
| Polypropylene glycol 1 | | | | | 1.58 | | |
| Polypropylene glycol 2 | | | | | | 1.12 | |
| Polypropylene glycol 3 | | | | | | | 4.96 |
| JIS A hardness | 69 | 69 | 67 | 68 | 68 | 67 | 68 |
| Tensile properties | | | | | | | |
| $M_{100}$ (MPa) | 2.49 | 2.36 | 2.18 | 2.11 | 2.15 | 2.17 | 2.13 |
| $M_{300}$ (MPa) | 4.16 | 3.68 | 2.74 | 2.71 | 2.74 | 2.82 | 2.72 |
| $T_B$ (MPa) | 14.4 | 17.0 | 7.7 | 3.7 | 8.6 | 8.7 | 4.6 |
| $E_B$ (%) | 674 | 718 | 943 | 468 | 956 | 922 | 616 |
| Compression set (%) | 52 | 57 | 68 | 66 | 83 | 80 | 77 |
| Sheet surface tackiness | None | None | Yes | Yes | None | None | Yes |
| Recyclability | A | A | A | A | A | A | A |

The components shown in Table 2 are as described below.

polyethylene glycol laurylamine 1: NYMEEN L-202 manufactured by NOF Corporation polyethylene glycol laurylamine 2: NYMEEN L-207 manufactured by NOF Corporation polyethylene glycol 1: PEG #1000 manufactured by NOF Corporation polyethylene glycol 2: PEG #2000 manufactured by NOF Corporation polypropylene glycol 1: Excenol 1020 manufactured by Asahi Glass Co., Ltd.

polypropylene glycol 2: Excenol 1030 manufactured by Asahi Glass Co., Ltd.

polypropylene glycol 3: Excenol 3020 manufactured by Asahi Glass Co., Ltd.

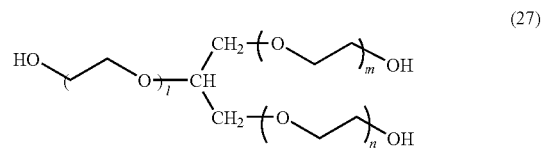

(27)

wherein l, m, and n independently represent an integer of at least 1.

The thermoplastic elastomers obtained in the reaction were confirmed for their structure by NMR and IR.

The thermoplastic elastomers obtained in Examples 15 to 18 were evaluated for their recyclability, JIS-A hardness, tensile properties, Compression set (C-Set), and sheet surface tackiness by the measurement procedures as described above. The results are shown in Table 3.

TABLE 3

|  | Example 15 | Example 16 | Example 17 | Example 18 |
|---|---|---|---|---|
| Maleinized EPM | 110 | 110 | 110 | 110 |
| ATA | 1.32 | 1.02 | | |
| IMH | | | 2.41 | 1.88 |
| UNIOX G450 | 0.271 | 0.814 | 0.271 | 0.814 |
| JIS-A hardness | 72 | 70 | 74 | 74 |
| Tensile properties | | | | |
| $M_{100}$ (MPa) | 2.24 | 2.42 | 2.42 | 2.36 |
| $M_{300}$ (MPa) | 3.32 | 4.36 | 4.09 | 3.83 |
| $T_B$ (MPa) | 9.36 | 10.24 | 11.29 | 7.84 |
| $E_B$ (%) | 777 | 630 | 695 | 521 |
| Compression set (%) | 53 | 45 | 44 | 20 |
| Sheet surface tackiness | None | None | None | None |
| Recyclability | A | A | A | A |

The results shown in Table 3 demonstrate that the thermoplastic elastomers obtained in Examples 15 to 18 exhibit superior compression set as well as equivalent or superior tensile strength at break and elongation at break compared to those obtained in Examples 10 to 14.

What is claimed is:

1. A thermoplastic elastomer having a side chain having a moiety crosslinkable by hydrogen bond containing a carbonyl-containing group and a nitrogen-containing heterocycle, and another side chain having a covalently crosslinkable moiety, the thermoplastic elastomer having been crosslinked at the covalently crosslinkable moiety by at least one bond selected from the group consisting of amide, ester, lactone, urethane, ether, thiourethane, and thioether and the nitrogen-containing heterocycle being a triazole ring, a thiodiazole ring, a pyridine ring, an imidazole ring or a hydantoin ring.

2. A thermoplastic elastomer according to claim 1 in which the crosslinking at the covalently crosslinkable moiety contains a tertiary amino group.

3. A thermoplastic elastomer according to claim 1 or 2 in which the crosslinking at the covalently crosslinkable moiety contains at least one of the structures represented by the following formulae (4) to (6):

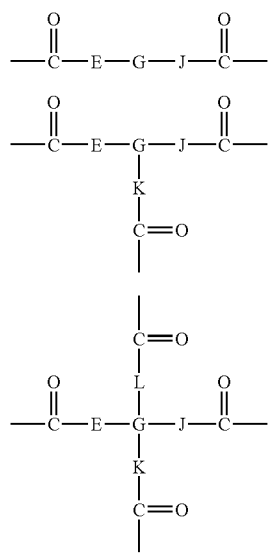

wherein E, J, K, and L are independently a single bond, oxygen atom, amino group NR' (wherein R' is hydrogen atom or an alkyl group containing 1 to 10 carbon atoms), sulfur atom, or an organic group containing such atom or group, and G is a hydrocarbon group containing 1 to 20 carbon atoms which may further contain oxygen atom, sulfur atom, or nitrogen atom and which may be branched.

4. A thermoplastic elastomer according to claim 3 in which the crosslinking at the covalently crosslinkable moiety contains at least one of the structures represented by the following formulae (7) to (9):

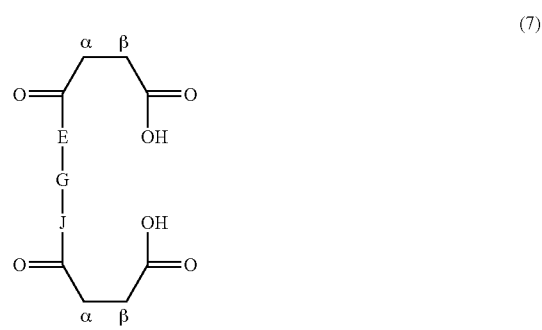

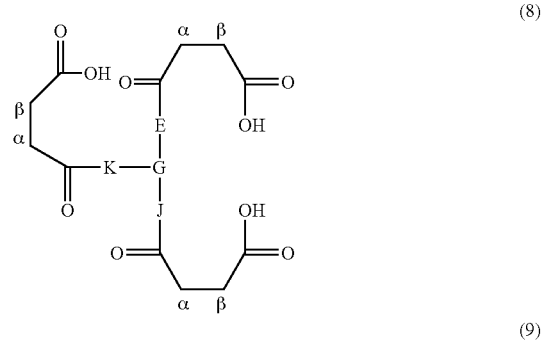

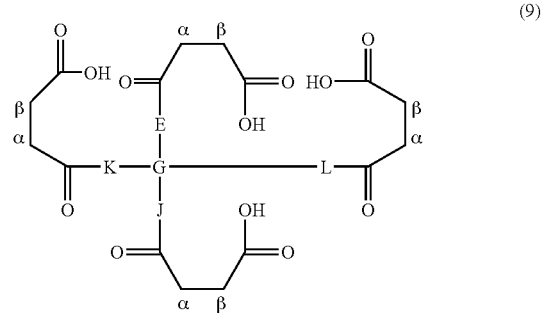

wherein E, J, K, and L are independently a single bond, oxygen atom, amino group NR' (wherein R' is hydrogen atom or an alkyl group containing 1 to 10 carbon atoms), sulfur atom, or an organic group containing such atom or group, and G is a hydrocarbon group containing 1 to 20 carbon atoms which may further contain oxygen atom, sulfur atom, or nitrogen atom and which may be branched, the structures bonding to a main chain either at α or β position.

5. A thermoplastic elastomer according to claim 3 in which G contains tertiary amino group.

6. A thermoplastic elastomer according to claim 4 in which G contains tertiary amino group.

7. A thermoplastic elastomer according to claim 1 in which the crosslinking at the covalently crosslinkable moiety is formed by a reaction between a cyclic acid anhydride group with hydroxy group or amino group and/or imino group.

8. A thermoplastic elastomer according to claim 2 in which the crosslinking at the covalently crosslinkable moiety is formed by a reaction between a cyclic acid anhydride group with a hydroxyl group, an amino group, an imino group or an amino group and an imino group.

9. A thermoplastic elastomer according to claim 3 in which the crosslinking at the covalently crosslinkable moiety is formed by a reaction between a cyclic acid anhydride group with a hydroxyl group, an amino group, an imino group or an amino group and an imino group.

10. A thermoplastic elastomer according to claim 4 in which the crosslinking at the covalently crosslinkable moiety is formed by a reaction between a cyclic acid anhydride group with a hydroxyl group, an amino group, an imino group or an amino group and an imino group.

11. A thermoplastic elastomer according to claim 5 in which the crosslinking at the covalently crosslinkable moiety is formed by a reaction between a cyclic acid anhydride group with a hydroxyl group, an amino group, an imino group or an amino group and an imino group.

12. A thermoplastic elastomer according to claim 6 in which the crosslinking at the covalently crosslinkable moiety is formed by a reaction between a cyclic acid anhydride group with a hydroxyl group, an amino group, an imino group or an amino group and an imino group.

13. A thermoplastic elastomer according to claim 1 in which the side chain having the moiety crosslinkable by hydrogen bond has a structure represented by the following formula (1):

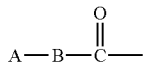

(1)

wherein A is a nitrogen containing heterocycle, and B is a single bond, oxygen atom, amino group NR' (wherein R' is hydrogen atom or an alkyl group containing 1 to 10 carbon atoms), sulfur atom, or an organic group containing such atom or group.

14. A thermoplastic elastomer according to claim 13 in which the side chain containing the moiety which can be crosslinked by hydrogen bond contains the structures represented by the following formula (2) or (3):

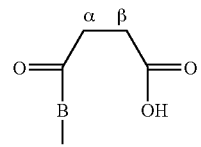

(2)

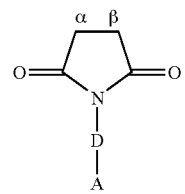

(3)

wherein A is a nitrogen containing heterocycle, and B and D are independently a single bond, oxygen atom, amino group NR' (wherein R' is hydrogen atom or an alkyl group containing 1 to 10 carbon atoms), sulfur atom, or an organic group containing such atom or group, the structures bonding to a main chain at α or β position.

15. A composition containing the thermoplastic elastomer according to claim 1.

16. A thermoplastic elastomer according to claim 1 in which the crosslinking is formed by a reaction between the covalently crosslinkable moiety and at least one covalently crosslinkable compound selected from the group consisting of polyethylene glycol laurylamine, polypropylene glycol laurylamine, polyethylene glycol octylamine, polypropylene glycol octylamine, polyethylene glycol stearylamine, propropylene glycol stearylamine, and polyethylene glycol glyceryl ether.

* * * * *